(12) United States Patent
Klein et al.

(10) Patent No.: US 12,079,464 B2
(45) Date of Patent: Sep. 3, 2024

(54) PREDICTIVE GESTURE OPTIMIZATIONS FOR MOVING OBJECTS ACROSS DISPLAY BOUNDARIES

(71) Applicant: MICROSOFT TECHNOLOGY LICENSING, LLC, Redmond, WA (US)

(72) Inventors: Christian Klein, Duvall, WA (US);
Ryan Pendlay, Bellevue, WA (US);
Lauren Edelmeier, Seattle, WA (US);
Peter Hammerquist, Shoreline, WA (US); Christoffer Peter Hart Hansen, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 333 days.

(21) Appl. No.: 16/739,076

(22) Filed: Jan. 9, 2020

(65) Prior Publication Data
US 2021/0096738 A1    Apr. 1, 2021

Related U.S. Application Data

(60) Provisional application No. 62/909,209, filed on Oct. 1, 2019.

(51) Int. Cl.
*G06F 3/048*    (2013.01)
*G06F 3/0481*    (2022.01)
(Continued)

(52) U.S. Cl.
CPC ........ *G06F 3/04883* (2013.01); *G06F 3/0481* (2013.01); *G06F 3/04845* (2013.01)

(58) Field of Classification Search
CPC .... G06F 3/0481; G06F 3/1423; G06F 3/0482; G06F 3/04883; G06F 1/1637; G06F 1/1692; G06F 1/1643
See application file for complete search history.

(56) References Cited

U.S. PATENT DOCUMENTS 9,507,512 B1    11/2016  Turner
2004/0021681 A1*  2/2004  Liao ............... G06F 1/1616
                                                 715/702

(Continued)

FOREIGN PATENT DOCUMENTS

CN    102037434 B    1/2014
CN    110221655 A    9/2019

(Continued)

OTHER PUBLICATIONS

"International Search Report and Written Opinion Issued in PCT Application No. PCT/US20/040203", Mailed Date: Oct. 9, 2020, 15 Pages.

(Continued)

*Primary Examiner* — Nicholas Augustine
(74) *Attorney, Agent, or Firm* — Newport IP, LLC; Jacob P. Rohwer

(57) ABSTRACT

Technologies are disclosed herein that enable a foldable computing device having multiple screen regions to perform an inter-region user interface (UI) operation in response to an intra-region UI gesture. For example, a UI gesture that begins and ends within a first region may be used to move a window from the first region to the second region. The disclosed technologies address the technical problems described above by providing succinct, accurate UI gestures that cause foldable computing devices to perform inter-region UI operations. The disclosed technologies further address the technical problems described above by combin- (Continued)

ing different types of UI gestures to increase gesture accuracy and expressiveness of inter-region UI operations.

16 Claims, 17 Drawing Sheets

(51) Int. Cl.
  *G06F 3/04845* (2022.01)
  *G06F 3/04883* (2022.01)
  *G06F 3/01* (2006.01)

(56) References Cited

U.S. PATENT DOCUMENTS

| | | | | |
|---|---|---|---|---|
| 2006/0013462 | A1* | 1/2006 | Sadikali | G16H 30/40 |
| | | | | 382/132 |
| 2006/0034043 | A1* | 2/2006 | Hisano | G06F 1/1616 |
| | | | | 361/679.04 |
| 2013/0057487 | A1* | 3/2013 | Yamanaka | G06F 1/1626 |
| | | | | 345/173 |
| 2014/0075377 | A1* | 3/2014 | Kang | H04M 1/72409 |
| | | | | 715/788 |
| 2015/0015511 | A1 | 1/2015 | Kwak et al. | |
| 2015/0143291 | A1 | 5/2015 | Zha | |
| 2015/0212647 | A1* | 7/2015 | Kim | G06F 1/1643 |
| | | | | 345/173 |
| 2017/0131873 | A1 | 5/2017 | Koenig et al. | |
| 2019/0325847 | A1* | 10/2019 | Kong | G06F 3/0416 |

FOREIGN PATENT DOCUMENTS

| | | |
|---|---|---|
| EP | 2641149 A2 | 9/2013 |
| EP | 2851772 A1 | 3/2015 |

OTHER PUBLICATIONS

First Office Action Received for Chinese Application No. 202080069023.1, mailed on Feb. 6, 2024, 17 pages (English Translation Provided).
Communication pursuant to Article 94(3) EPC Received for European Application No. 20740480.7, mailed on Jun. 11, 2024, 10 pages.
U.S. Appl. No. 62/909,209 filed Oct. 1, 2019.

* cited by examiner

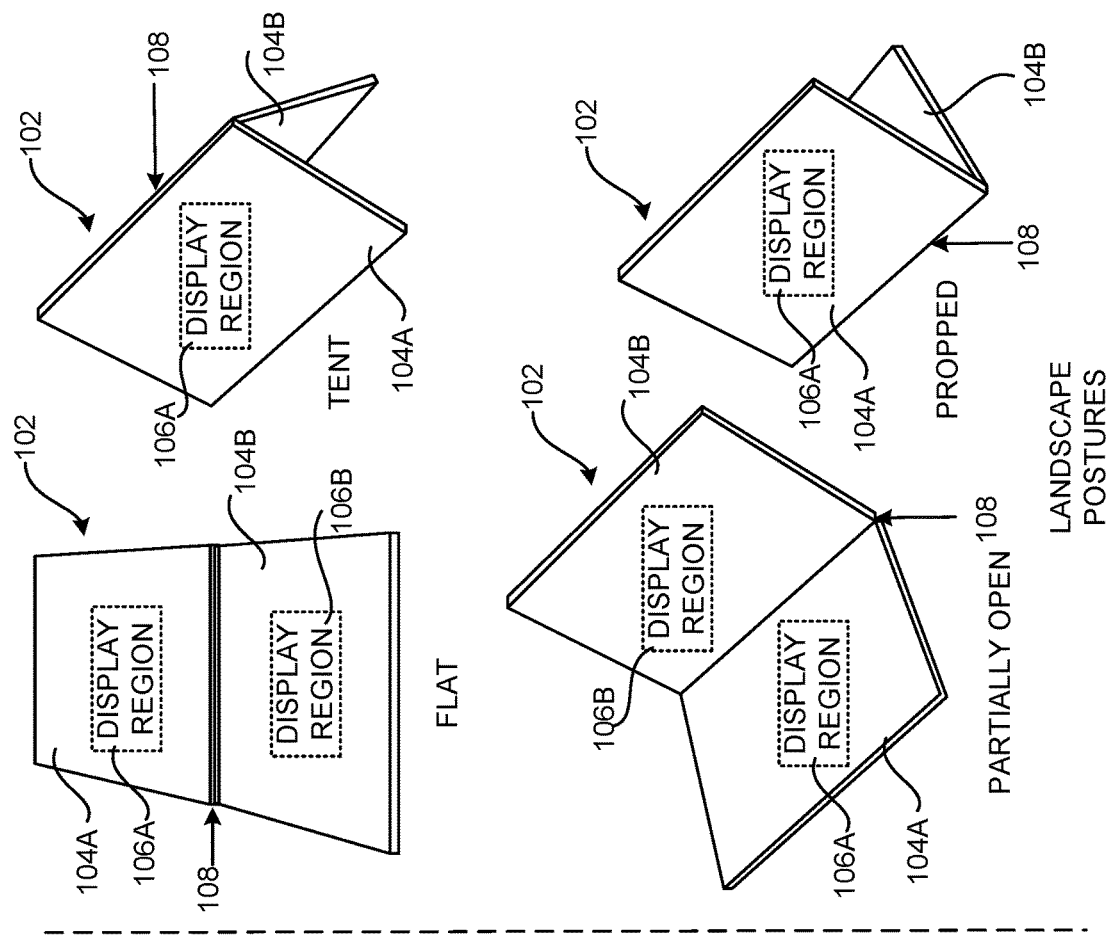
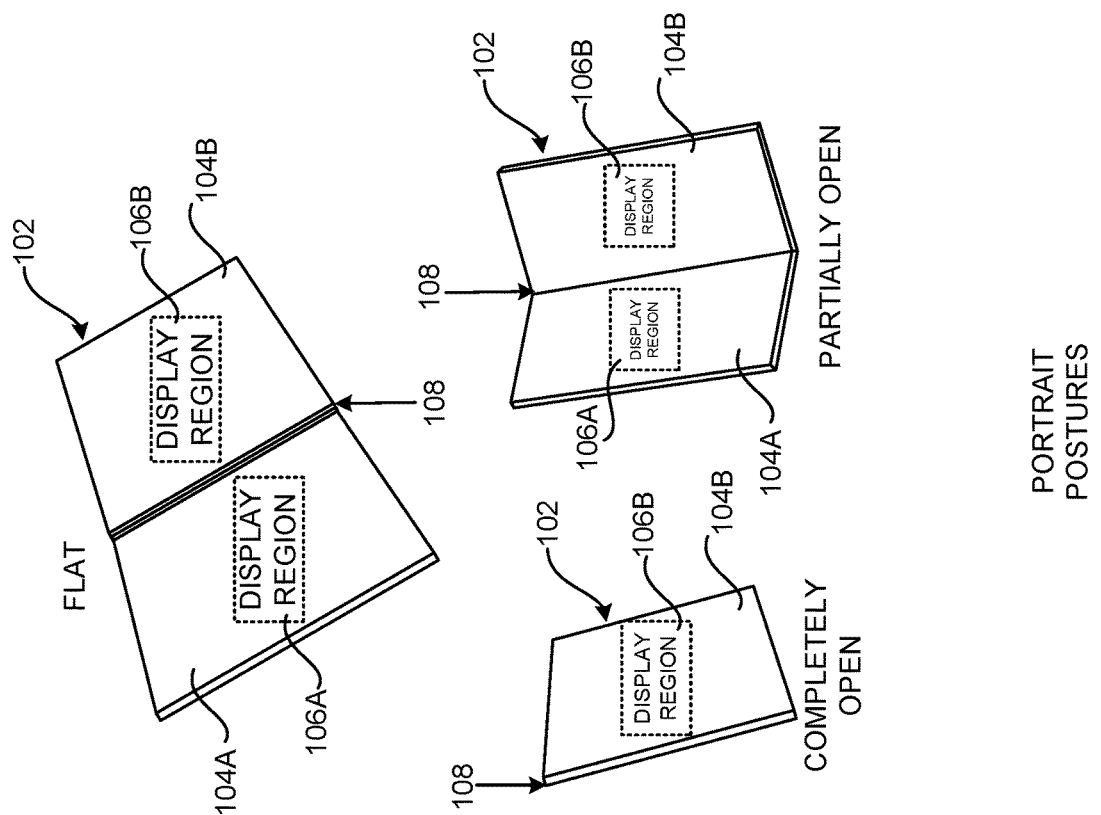
FIG. 1B
FIG. 1A

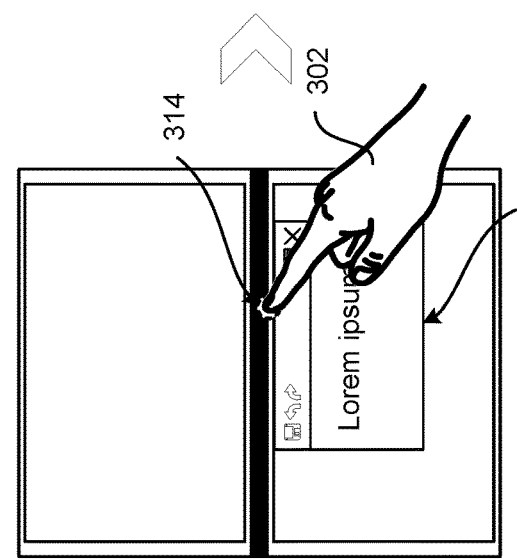
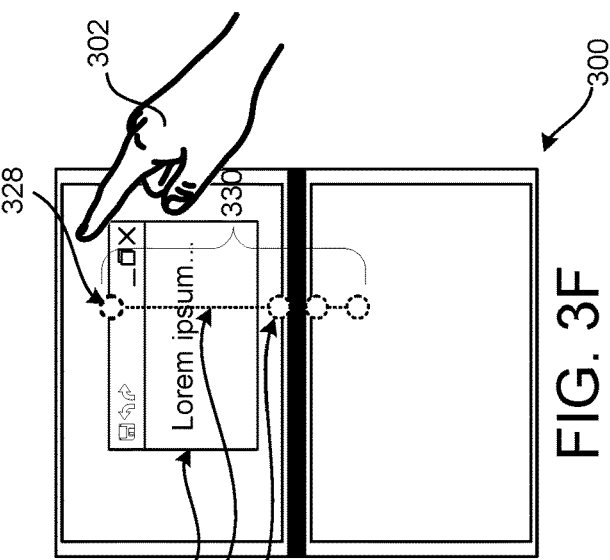
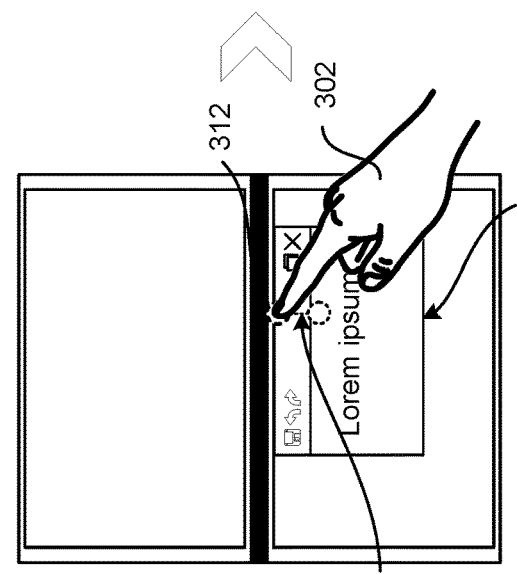
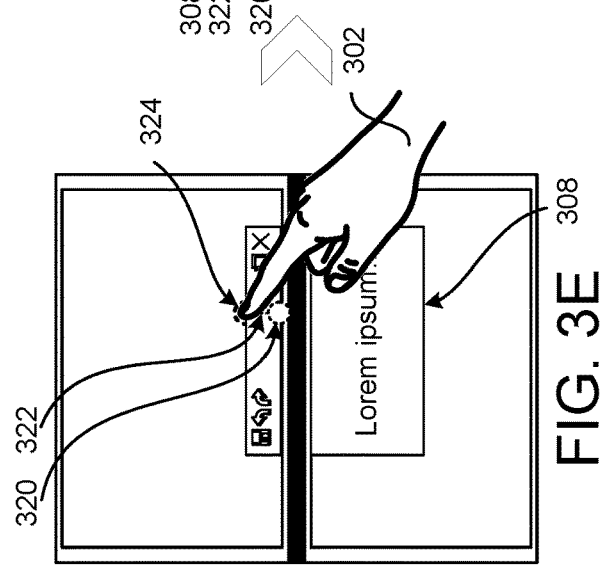
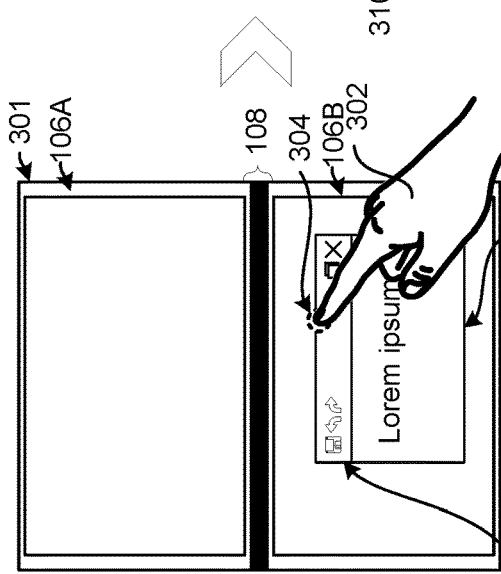
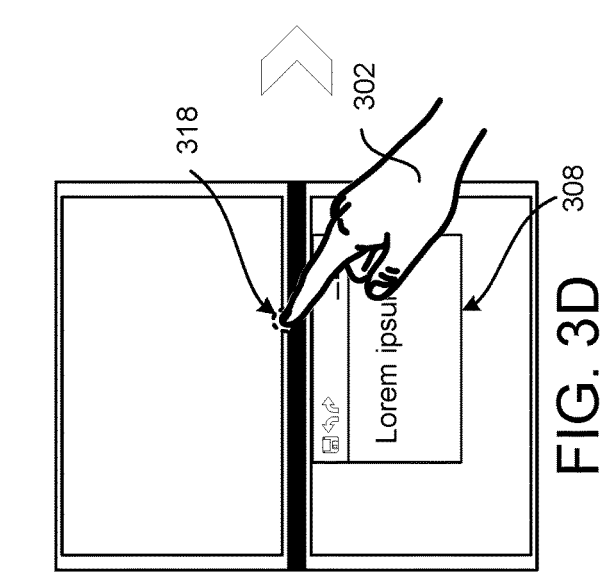

PREDICTIVE GESTURE OPTIMIZATIONS FOR MOVING OBJECTS ACROSS DISPLAY BOUNDARIES

CROSS-REFERENCE TO RELATED APPLICATIONS

This application claims priority to U.S. Provisional Patent Application No. 62/909,209, entitled "PREDICTIVE GESTURE OPTIMIZATIONS FOR MOVING OBJECTS ACROSS DISPLAY BOUNDARIES," which was filed Oct. 1, 2019, and which is expressly incorporated herein by reference in its entirety.

BACKGROUND

Foldable computing devices include devices with two screens joined with a hinge or devices with bendable screens. These types of devices can provide benefits over traditional computing devices such as laptop computers. Commonly, however, these devices implement user interface ("UI") paradigms originally designed for computing devices with traditional form factors. As a result, UIs provided by foldable computing devices can be cumbersome and error-prone, which can lead to incorrect or inadvertent user input and unnecessary consumption of computing resources.

It is with respect to these and other technical challenges that the disclosure made herein is presented.

SUMMARY

Technologies are disclosed herein that enable a foldable computing device having multiple screen regions to perform an inter-region UI operation in response to an intra-region UI gesture. For example, a UI gesture that begins and ends within a first region may be used to move a window from the first region to the second region. The disclosed technologies address the technical problems described above by providing succinct, accurate UI gestures that cause foldable computing devices to perform inter-region UI operations.

The disclosed technologies further address the technical problems described above by combining different types of UI gestures to increase gesture accuracy and expressiveness of inter-region UI operations. Through implementations of the disclosed technologies, UIs can be provided by foldable devices that are easier to utilize and that result in fewer user input errors. Additionally, the utilization of computing resources by foldable computing devices can be reduced by avoiding the processing associated with inefficient navigation of a UI and inadvertent or incorrect user input. Other technical benefits not specifically mentioned herein can also be realized through implementations of the disclosed subject matter.

In one embodiment, a foldable computing device is configured to receive a UI gesture that begins and ends in a first display region. In response, the foldable computing device can perform a UI operation that manifests at least partially in a second display region. Details regarding such a foldable computing device are provided below with regard to FIGS. 1A-12.

A foldable computing device is also disclosed herein that is configured to receive a combination of different types of UI gestures, and in response, perform an operation that utilizes multiple display regions. For example, a drag and drop gesture may be combined with a flick gesture such that some aspect of the drag and drop gesture modifies the operation caused by the flick gesture. Details regarding such a foldable computing device are provided below with regard to FIGS. 13-1

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A and 1B are device posture diagrams illustrating aspects of the configuration and operation of a hinged computing device that implements the disclosed technologies in one particular configuration;

FIGS. 3A-3F are device user interface diagrams illustrating aspects of a prior art technique to move a window from one region to another;

DETAILED DESCRIPTION

Figure 2B:
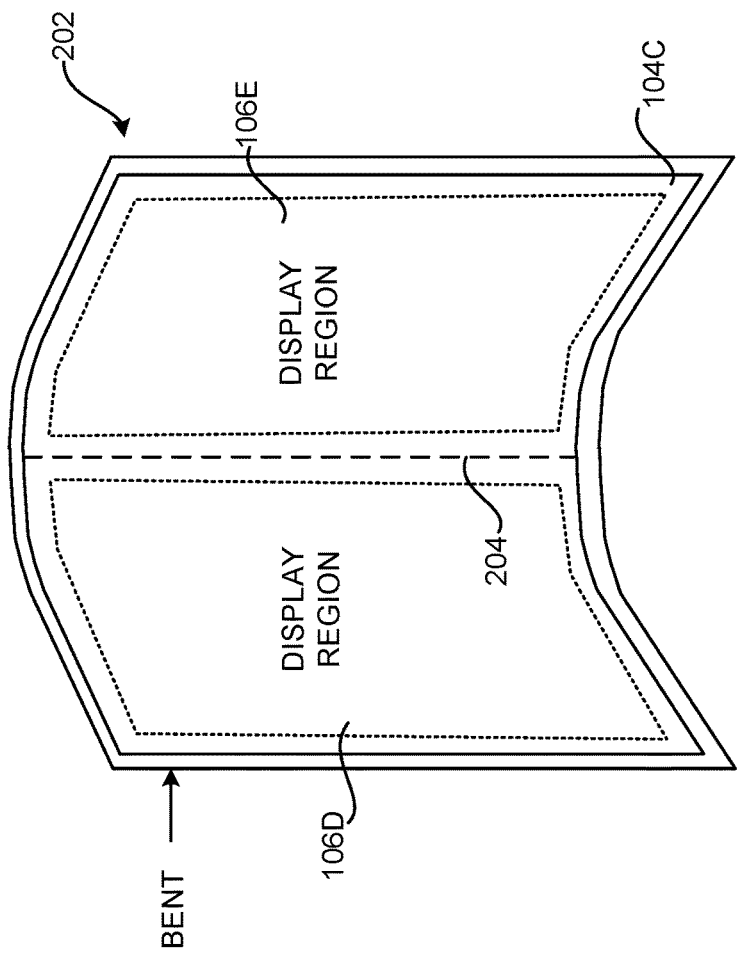
FIGS. 2A-2C are device posture diagrams illustrating aspects of the configuration and operation of a bendable computing device that implements the disclosed technologies in one particular configuration.

The following detailed description is directed to technologies for predictive gesture optimizations for moving objects across display boundaries and compound symbolic and manipulation gesture language for multi-screen windowing. As discussed briefly above, implementations of the disclosed technologies can enable UIs to be provided that are easier to utilize and that result in fewer user input errors. Consequently, the utilization of computing resources can be reduced by avoiding the processing associated with inefficient navigation of a UI and inadvertent or incorrect user input, as compared to previous solutions. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), computing or processing systems embedded in devices (such as wearable computing devices, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for providing inter-region UI operations in response to intra-region UI gestures and for combining different types of UI gestures to perform inter-region operations will be described.

Prior to discussing particular aspects of the disclosed technologies, a brief introduction to foldable computing devices (which might be referred to herein as "foldable devices") will be provided. As discussed briefly above, foldable devices include multiple screen form factor devices (which might be referred to herein as "hinged devices") that have two physical display screens joined together with a hinge or other equivalent mechanism. By manipulating the orientation of the display screens with respect to one another by way of the hinge, such devices can be configured in a multitude of postures, some of which are described in greater detail below with regard to FIGS. 1A and 1B.

Foldable devices also include computing devices having a bendable display screen (which might be referred to herein as "bendable devices"), such as computing devices utilizing flexible screen technology. When such a device is not bent, it presents a single display surface. When bended, these devices present a single display surface with a crease in the middle. Bendable devices can also be configured in a multitude of postures by varying the amount of bend, some of which are also described in greater detail below with reference to FIGS. 1A and 1B.

The display screens of foldable computing devices can be touch sensitive, thereby enabling such devices to recognize touch or stylus input, presses, swipes, and other types of gestures, some of which are described below. These devices can also, of course, be used while being held in various orientations, some of which are described below with regard to FIGS. 1A and 1B.

Referring now to FIGS. 1A and 1B, details regarding several postures for foldable display devices will be described. The examples shown in FIGS. 1A and 1B illustrate some possible postures for a hinged device 102. It is to be appreciated, however, that the illustrated postures generally apply to bendable devices as well.

As shown in FIG. 1A, a hinged device 102 can be configured in multiple postures by varying the angle of the hinge 108 that connects two display devices 104A and 104B (which might be referred to herein as "displays"). In FIG. 1A, for instance, the hinged device 102 is shown in a flat, unbent posture where the display screens 104A and 104B are parallel to one another in portrait orientation, a completely open, fully bent posture where a single display 104B faces one direction in portrait orientation while the other display 104A faces the opposite direction, and a partially open posture in portrait orientation where the hinge 108 is bent. The hinged device 102 can also be configured in a closed posture (not shown) where neither display screen is visible.

In FIG. 1B, the hinged device 102 is shown in a flat posture where the display screens 104A and 104B are in unbent landscape orientation, in a tented posture where hinged device 102 stands on edges opposite hinge 108 and present displays 104A and 104B in opposite directions, in a propped posture where the angle of the hinge 108 enables the hinged device 102 to stand on display 104B to present a single display 104A, and in a partially open posture where one display 104A is lies flat and the other display 104B is at least partially upright, thereby forming a configuration similar to a traditional laptop computer. In this regard, it is to be appreciated that the postures illustrated in FIGS. 1A and 1B are illustrative and that other postures might also be possible.

As also shown in FIGS. 1A and 1B, the display device 104A provides a first display region 106A that encompasses all or a part of the display 104A. Similarly, the display device 104B provides a second display region 106B that encompasses all or a part of the display 104B. However, the disclosed embodiments are equally applicable to any display regions, including display regions that are one of many regions within a display device and/or display regions that span display devices. The first display region 106A and the second display region 106B can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. Various uses of the display regions 106A and 106B provided by the hinged device 102 will be described below.

Figure 2A:
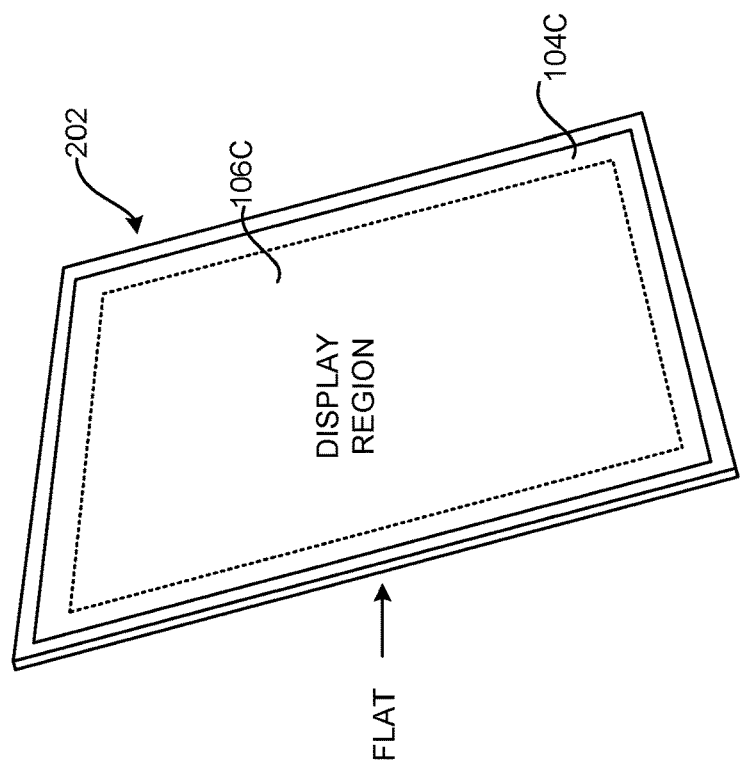

Referring now to FIGS. 2A and 2B, details will be provided regarding the configuration and operation of a bendable device 202. As mentioned above, a bendable device 202 can also be configured in postures the same as or similar to those described above with regard to FIGS. 1A and 1B. For instance, in the example posture shown in FIG. 2B, the bendable device 202 has been placed in a flat, unbent position, thereby presenting the entirety of the display 104C. The bendable device 202 can also be configured in a closed posture where neither display region is visible.

Figure 2C:
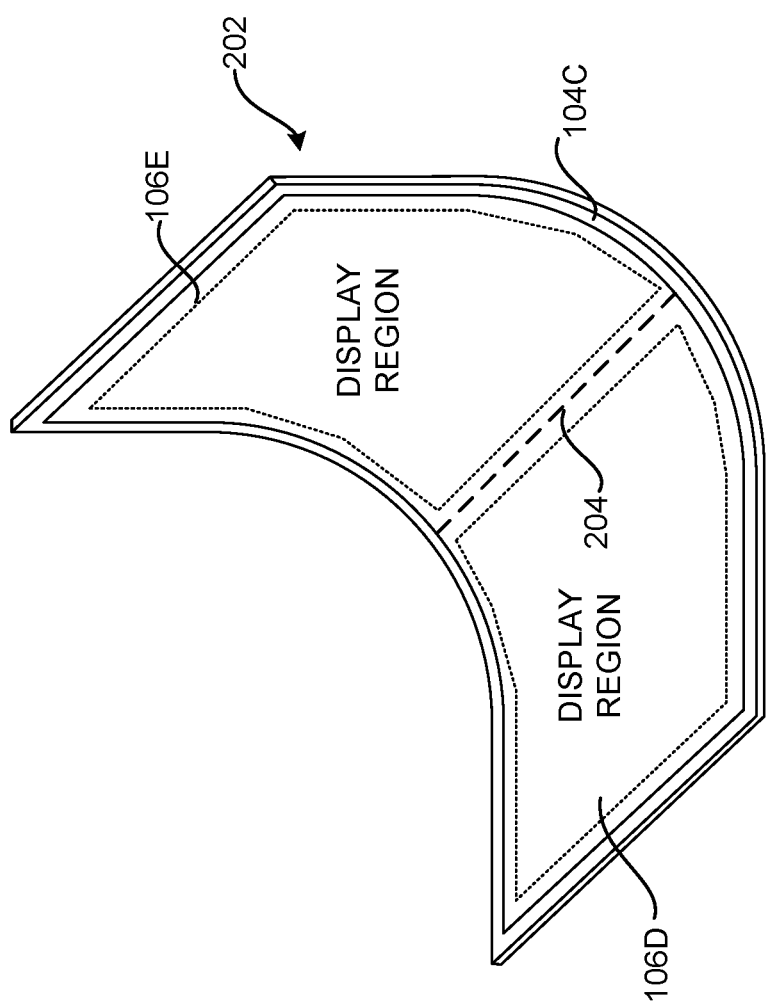

In the example posture shown in FIGS. 2B and 2C, the bendable device 202 has been partially bent similar to the partially open posture shown in FIGS. 1A and 1B. In particular, in the example shown in FIG. 2B, the bendable device 202 has been bent while the screen 104C is in a landscape orientation. In the example shown in FIG. 2C, the device 202 has been bent while the screen 104C is in portrait orientation.

When the bendable device 202 is bent, a crease or "fold" 204 is formed in the display 104C. The term "fold" as used herein might refer to the area where a foldable device is folded (i.e. the area of a hinge 108 on a hinged device 102 or the area where the display of a bendable device 202 bends).

As in the case of a hinged device 102, the bendable device 202 can also provide one or more display regions. However, in the case of a bendable device 202, the number of available display regions can vary based upon the posture of the device. For instance, a single display region 106C is provided when the bendable device 202 is in a flat state as shown in FIG. 2A. Two display regions 106D and 106E can be provided on the display 104C when the bendable device 202 is in a bent posture, such as that shown in FIG. 2B. Various details regarding the configuration and use of the display regions 106 (which are rendered using dotted lines throughout the FIGS.) provided by foldable devices are provided below.

Predictive Gesture Optimizations for Moving Objects Across Display Boundaries

Referring now to FIGS. 3A-3F, details will be provided regarding prior art inter-region gestures. It is to be appreciated that the foldable device 301 shown in FIGS. 3A-3F (and FIGS. 4A-11D) are shown two-dimensionally for ease of illustration. This is not, however, intended to indicate that the foldable device 301 is lying flat. Rather, in FIGS. 4A-4D and 6, the foldable device 301 is in a bent posture such as that shown in FIG. 1B.

Prior to discussing FIGS. 3A-3F and the other FIGS., it is also to be appreciated that certain relative terms (e.g. height, width, top, bottom, left, right) might be utilized herein to describe the configuration of the displays and display regions described herein. In this regard, it is to also be appreciated that these terms have been utilized herein for ease of discussion and are not to limit the configuration of the display regions or UI elements. Other terms can be utilized to describe the displays, display regions, UI elements, and their spatial relationships to one another It is also to be appreciated that although generally described separately, the various embodiments described briefly above and in further detail below can be utilized in combination with one another.

FIGS. 3A-3F are device user interface diagrams 300 illustrating aspects of a prior art technique to move a window from one region to another. Specifically, FIGS. 3A-3F illustrate an inter-region 'drag and drop' gesture 330 that begins in region 106B and ends in region 106A. These gestures, which were originally designed for slate form-factors like cellphones and tablets, are cumbersome and error prone when applied to integrated multiscreen devices like foldable device 301.

For example, a drag and drop gesture 330 that spans two regions may have an ambiguous meaning after the input device (e.g. finger 116) leaves region 106B but before it enters region 106A. This is because hinge 108 may not be touch-sensitive, and so foldable device 301 may not receive data indicating gesture 330 will continue into region 106A, e.g. to move a window from region 106B into region 106A, or if gesture 330 has ended at the edge of region 106B, e.g. to dock a window to the edge of region 106B. To deal with this ambiguity, foldable device 301 may pause to determine if a second gesture in region 106A is received and determine if it is a continuation of the first gesture. This pause reduces responsiveness of the user interface when there is no second gesture, causing a poor user experience.

Another challenge to inter-region gestures as depicted in FIGS. 3A-3F occurs when foldable device 301 is in a posture that makes inter-region gestures awkward, error prone, or impossible. For example, when foldable device 301 is tented or oriented as a traditional laptop, it may be difficult for a user to contiguously and accurately perform a gesture that spans regions 106B and 106A. When foldable device 301 is propped, performing a gesture that spans regions 106B and 106A may be difficult if display region 106B is hard to access.

FIG. 3A illustrates the beginning of an inter-region gesture 330. Touch 304 on title bar 306 of window 308 begins gesture 330. Touch 304 may be a press that is held at least throughout the portion of gesture 330 performed in region 106B. FIG. 3A depicts touch 304 being caused by a finger, although gestures could also be caused by a stylus, pen, or other physical object capable of activating the touchscreen sensor of region 106B.

FIG. 3B illustrates the continuation of the gesture that started in FIG. 3A. Pointer 302 has continued to press while moving along path 310 towards location 312 on hinge 108. Window 308 may move with pointer 302, creating the effect that it is dragged along by pointer 302. Pointer 302 may be a finger, stylus, pen, or any physical object capable of activating touch sensors of display regions 106A and 106B.

FIG. 3C illustrates pointer 302 sliding off region 106B onto hinge 108. In this example, hinge 108 is not touch sensitive, and so sliding off region 106B ends the gesture along path 310. Pointer 302 may continue to press location 314 of hinge 108 as part of a continuous swipe motion, even if the press is no longer registered.

FIG. 3D illustrates pointer 302 continuing to slide across hinge 108 to location 318. During this time, no input is received by foldable device 301. As a result, window 308 remains in the position it was in when pointer 302 stopped registering as input to region 106B.

FIG. 3E illustrates pointer 302 after having pressed region 106A at location 320 and continuing to swipe up along path 322 to location 324. Foldable device 301 may interpret this motion as a continuation of the gesture along path 310 based on factors such as proximity in time, proximity in space, continuity of the directions of paths 310 and 322, and the like. Nevertheless, associating the two paths as part of gesture 330 is error prone.

FIG. 3F illustrates pointer 302 completing a drag and drop operation of window 308 by continuing to swipe up along path 322 to location 328. While pointer 302 is swiping along path 322, foldable device 301 may move window 308 in sync, i.e. window 308 may be moved so that the same portion of title bar 306 remains under pointer 302 throughout the drag operation. Once pointer 302 lifts from region 106A at location 328, drag 330 is complete and the drop operation is performed, leaving window 308 in a new location.

FIGS. 4A-4D are device user interface diagrams 400 illustrating aspects of a symbolic 'flick' gesture 414 that originates in region 106B and crosses a dynamically determined threshold 410 in region 106B. In one configuration, a flick gesture is a gesture that moves generally in one direction, allowing for some curvature as a margin of error. A flick gesture can be used for various reasons including, but not limited to, paging horizontally or vertically through a document, moving a window, icon, or other UI element to a different region, moving an icon into a folder, resizing a window, e.g. maximizing or minimizing the window, etc. In some configurations, a flick gesture may be interpreted similar to a keyboard shortcut—a defined gesture that, once recognized by the system, causes a command to be executed. Threshold 410 is dynamically calculated in that the location and orientation of threshold 410 depends on a number of factors, some of which may be updated as flick 414 is in progress. Threshold 410 may be visible or become visible as pointer 302 approaches it. Additionally, or alternatively, foldable device 301 may produce haptic, audio, and/or visual feedback as pointer 302 crosses threshold 410.

In some configurations, a symbolic gesture may begin on a UI item, e.g. based on a touch, press, hover-over, etc. of the UI item. UI items may include windows, dialog boxes, icons, menus, application content, or the like. In other embodiments, a context-free symbolic gesture may begin on a desktop background, independent of a UI item. In some configurations, in response to identifying a symbolic gesture, foldable device 301 may perform an operation with the UI item and/or a target associated with the gesture. For example, an operation associated with a symbolic gesture may move a window (the UI item) to an open folder (the target associated with the gesture). In some embodiments, foldable device 301 triggers a command associated with a symbolic gesture as soon as foldable device 301 recognizes the gesture beyond a defined confidence threshold. As such, foldable device 301 may not display command-specific real-time feedback during the gesture, as the meaning of the gesture is not known until the gesture is recognized, at which point the command is performed.

In contrast with a symbolic gesture, during a manipulation gesture, foldable device 301 provides real-time feedback as the gesture progresses. For example, during a manipulation gesture, foldable device 301 may display an underlying UI item moving across region 106B in a one-to-one manner with pointer 302. For instance, a drag-and-drop operation may be performed with a manipulation gesture, during which the UI item being dragged moves across the display region in sync with the manipulation gesture. Another example of a manipulation gesture is a scrolling gesture—e.g. moving document content up or down in sync with the manipulation gesture.

Symbolic gestures may have defined shapes, including flick gestures, tap gestures, timed gestures, circle gestures, angle gestures, etc. As discussed above, a flick gesture is a gesture that moves generally in one direction, allowing for some curvature as a margin of error. Tap gestures may include a press, touch, hover-over, or other activation of a UI item that lasts less than a defined period of time. Timed gestures may include a press, touch, hover-over, or other activation gesture that is held for at least a defined period of time before being released. In some configurations, multiple timed gestures may be defined for a UI item based on how long the activation gesture is held. Circle gestures may define a radius, a direction, and a degree of completion (e.g. 270 degrees). Angle gestures may define a distance before the angle, the size of the angle, and a direction of the angle.

As a gesture is first detected, foldable device 301 may distinguish a symbolic gesture from a manipulation gesture based on initial gesture speed and/or acceleration. For example, foldable device 301 may identify a gesture as symbolic if, at the start of the gesture, pointer 302 moves faster than a defined speed or accelerates faster than a defined rate for a defined amount of time.

Once foldable device 301 determines that the gesture is a symbolic gesture, foldable device 301 may create a list of potential symbolic gestures the user could be performing. For example, if the gesture started at a file icon with a particular extension, the foldable device 301 may create a list of potential symbolic gestures supported by file icons with that particular extension, e.g. move the file, open the file with a first application, open the file with a second application, open the file on a different region, etc.

The list of potential symbolic gestures may be further limited by the direction of the gesture, which region 106 the gesture began in, the orientation and/or posture of foldable device 301, which application or application type contained the UI item, the location of the initial touch relative to the edges of the region, the location of the initial touch relative to hinge 108, the existence (or lack thereof) of other UI items on or near the path of the gesture or in the direction of the gesture, or a combination thereof.

Foldable device 301 may then determine which of the possible symbolic gestures, if any, is performed. Foldable device 301 may determine which symbolic gesture is performed using thresholds—lines that, when crossed by pointer 302, determine that a corresponding symbolic gesture has been performed. Foldable device 301 may create a threshold for each gesture in the set of possible gestures.

Thresholds may have different shapes, e.g. straight, curved, or square, etc., and may be placed in different directions and at different distances from the gesture starting location. The specific shapes, directions, and distances may be determined in part based on a user configuration or a default value associated with each gesture. Shapes, directions, and distances of thresholds may also be dynamically configured based on the presence of other thresholds—e.g. to disambiguate or prioritize one threshold over another.

Shapes, directions, and distances of thresholds may also be dynamically configured based on UI items along the gesture or in the direction defined by the gesture. For example, if hinge 108 is 150 pixels away from a file icon, foldable device 301 may place a threshold triggering a flick gesture 80 pixels from the file icon in the direction of hinge 108.

Once pointer 302 is lifted, or the gesture is otherwise determined to be completed, e.g. due to a lack of motion, foldable device 301 may determine which thresholds, if any, the completed gesture crossed. If the completed gesture didn't cross any thresholds, then foldable device 301 may determine that no symbolic gesture defined by crossing a threshold was performed. If one threshold was crossed, the corresponding symbolic gesture is identified. If more than one threshold was crossed, foldable device 301 may select a symbolic gesture corresponding to the last threshold to be crossed. In other embodiments, each symbolic gesture may have a defined priority, and foldable device 301 may select the symbolic gesture with the highest priority. In other embodiments, foldable device 301 may select the symbolic gesture associated with the threshold that is furthest from the starting location of the gesture.

Figure 4B:
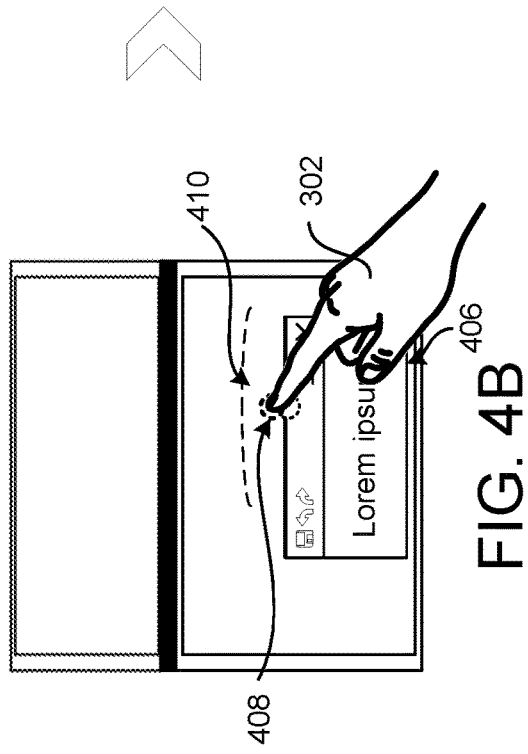
FIGS. 4A-4D are device user interface diagrams illustrating aspects of a symbolic 'flick' gesture that originates in a first display region, crosses a dynamically determined threshold in the first display region, and causes a window to move to a second display region, according to one embodiment.
Figure 4D:
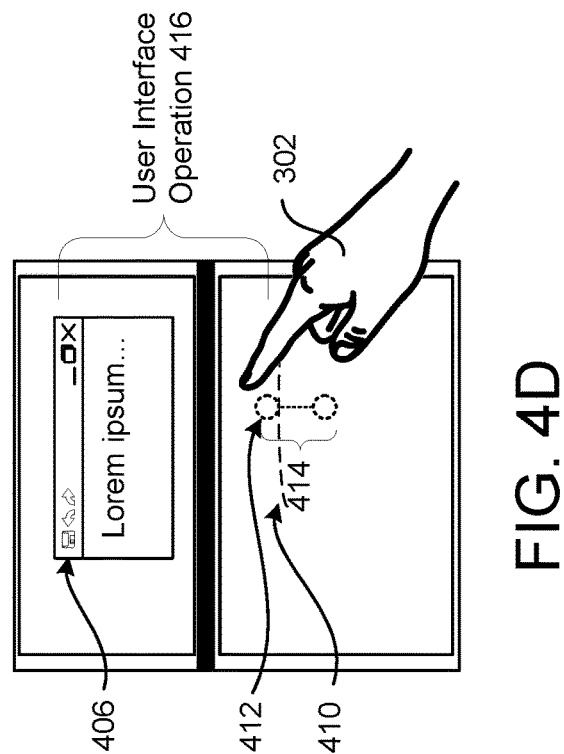
Figure 4A:
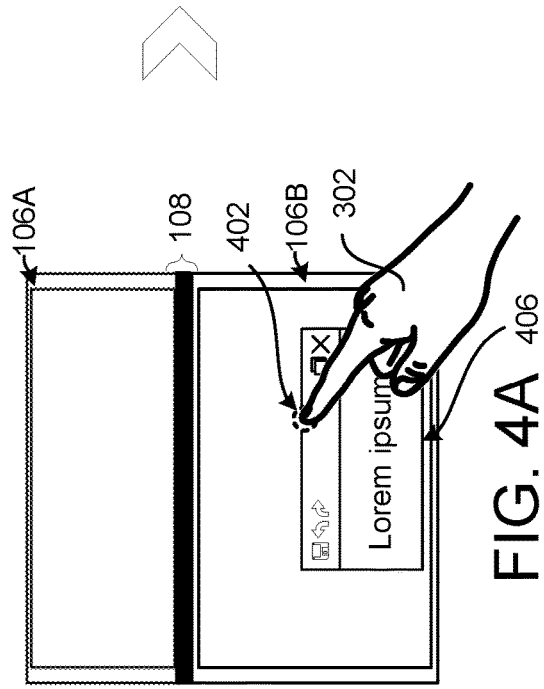

FIG. 4A illustrates pointer 302 pressing location 402 of region 106B, initiating a symbolic 'flick' gesture 414. As referred to herein, pressing a location may refer to physically touching a touchscreen device, e.g. with a finger, stylus, or other object. Pressing a location may also refer to an object moving over or hovering over a location near the screen, e.g. hovering less than half a centimeter over location 402 for at least a defined period of time. FIG. 4A depicts flick gesture 414 beginning on window 406 such that window 406 becomes a parameter of the command associated with flick gesture 414. As discussed above, beginning a flick gesture over a window is one example of a gesture type and underlying UI item—other types of symbolic gestures may begin over other types of UI items. Additionally, or alternatively, symbolic gestures may begin over a blank section of region 106B, e.g. a desktop background or other portion of region 106B that does not have a UI item in or near it. In these cases, the corresponding operation may be a global operating system command.

FIG. 4B illustrates pointer 302 initiating flick 414 by moving from location 402 to location 408 of region 106B. As discussed above, foldable device 301 may distinguish flick 414 from a manipulation gesture, e.g. a drag and drop gesture, by a speed or acceleration of the initial movement of the gesture. Once flick 414 is identified as a symbolic gesture, foldable device 301 may establish threshold 410 between window 406 and hinge 108. The distance from location 408 to threshold 410 may be based in part on the distance from location 408 to hinge 108. The distance from location 408 to threshold 410 may also be based on a pre-configured distance made long enough to minimize false positive gestures while short enough to allow symbolic gestures to be performed easily. Foldable device 301 may choose a shape and orientation of threshold 410, e.g. a curve that is concave from the perspective of location 408.

Threshold 410 may be dynamically updated based on the current location, speed, and acceleration of pointer 302. If the speed or acceleration of pointer 302 is particularly fast, e.g. compared to a baseline for this user, then threshold 410 may be moved closer to location 408 as the intent to perform a symbolic gesture is clearer. However, if the speed or acceleration of pointer 302 is borderline and/or slowing down, threshold 410 may be moved away from location 408 so as to avoid a false positive symbolic gesture when the user actually intended to perform a manipulation gesture.

Figure 4C:
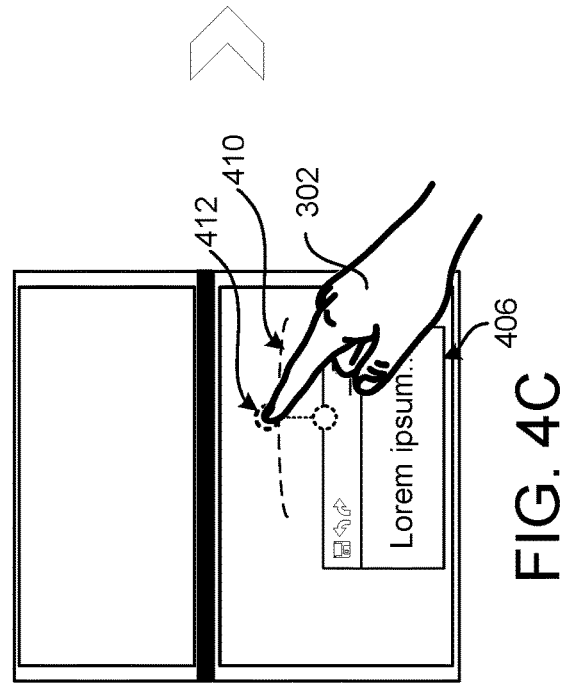

FIG. 4C illustrates pointer 302 crossing threshold 410 to location 412. In some configurations, a symbolic gesture that crosses threshold 410 triggers the corresponding operation, even before pointer 302 is lifted or the gesture otherwise ends. For instance, when there is no ambiguity as to which symbolic gesture is intended—i.e. if there are no other thresholds that gesture 414 may also cross—symbolic gesture 414 may be considered complete as threshold 410 is crossed.

In contrast to a manipulation gesture, FIG. 4C illustrates an embodiment in which a symbolic gesture does not cause window 406 to move with pointer 302. Rather, window 406 remains in place unless and until flick gesture 414 is completed (and the corresponding command moves window 406). In other embodiments, foldable device 301 may provide visual feedback during a symbolic gesture that does not depend on which command the symbolic gesture ultimately triggers. For example, foldable device 301 may move window 406 in a one-to-one manner with pointer 302 throughout the symbolic gesture. Foldable device 301 may alternatively move window 406 in the direction of pointer 302, but only for a defined distance or a defined percentage of the movement of pointer 302. Foldable device 301 may also make a copy of window 406, or an outline of window 406, and provide visual feedback by moving the copy/outline based on the movement of pointer 302. Additionally, or alternatively, foldable device 301 may alter the size of, highlight, animate, or otherwise emphasize window 406 during the symbolic gesture to indicate which UI item will be manipulated. For example, while pointer 302 is performing a symbolic gesture on window 406, foldable device 301 may show that window 406 is moving, but not provide feedback that disambiguates between related commands that the user may be performing, e.g. snapping the window to the edge of the region, spanning the window to encompass an unused portion of the region, copying, moving, etc.

In some configurations, whether or not foldable device 301 provides feedback during the symbolic gesture, foldable device 301 may provide feedback as soon as the threshold 410 is crossed and the command associated with the gesture is determined, but before the gesture is completed. For example, pointer 302 may cross threshold 410 on the way to completing symbolic gesture 414 at location 412. In response to crossing threshold 410, foldable device 301 may determine that a command 416 to move window 406 is intended. Foldable device 301 may give an indication that threshold 410 was crossed, e.g. with a haptic, audio, or visual indication that threshold 410 was crossed. For example, if threshold 410 is visible, foldable device 301 may flash, highlight, or otherwise emphasize threshold 410 as pointer 302 crosses it. Whether or not threshold 410 was visible, foldable device 301 may provide visual, audio, or haptic feedback when threshold 410 is crossed, e.g. by bouncing, shaking, changing size, or otherwise altering the appearance of window 406. Additionally, or alternatively, foldable device 301 may indicate with visual, audio, or haptic feedback which command will be performed on window 406. In the example illustrated in FIGS. 4A-4D of moving window 406 to a different display region, foldable device 301 may display an outline of window 406 in the destination region once pointer 302 crosses threshold 410. Once gesture 414 ends at location 412, foldable device 301 may perform the move operation 416 by moving window 406 to where the outline was displayed.

FIG. 4D illustrates pointer 302 released from region 106B, causing flick gesture 414 to be completed. In this example, the operation corresponding to flick gesture 414 is operation 416, moving the target, window 406, to region 106A. In this way, window 406 is moved to region 106A without flick gesture 414 entering region 106A.

As discussed above, flick gesture 414 is considered to have been completed if threshold 410 was crossed within a defined amount of time, and/or if threshold 410 was crossed without traveling more than a defined distance. Similarly, in order to be considered complete, foldable device 301 may require that flick gesture 414 is completed within a defined amount of time after crossing threshold 410 and without deviating more than a defined number of degrees from the direction of flick gesture 414 after crossing threshold 410.

By requiring that flick gesture 414 be released quickly and without changing direction significantly, foldable device 301 has greater confidence that flick gesture 414 is the intended gesture, i.e. that flick gesture 414 is not actually the beginning of a manipulation gesture or a different symbolic gesture with a more distant threshold.

FIGS. 5A-5F are device user interface diagrams 500 illustrating aspects of a manipulation gesture 518 that originates over a file icon 504 in display region 106B, enters a dynamically determined target zone 510A, and causes an operation to be performed on the corresponding file in region 106A. As discussed above, a manipulation gesture is a gesture that moves an item with pointer 302 in a one-to-one manner. Put differently, as pointer 302 moves around region 106B performing manipulation gesture 518, a UI item like file icon 504 moves with it.

Figure 5A:
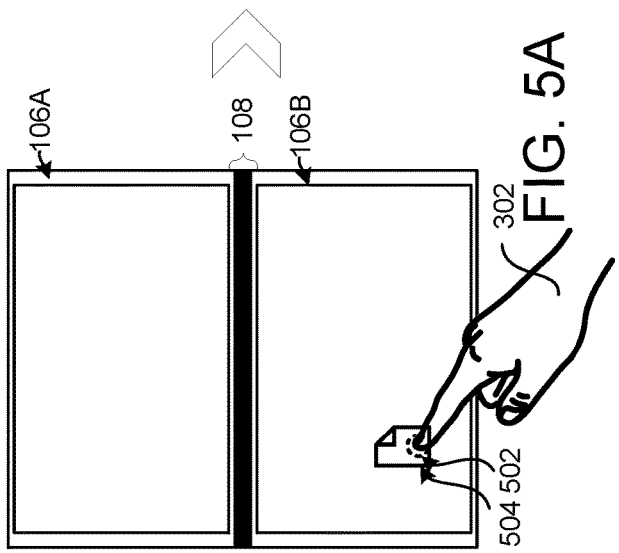
FIGS. 5A-5F are device user interface diagrams illustrating aspects of a manipulation gesture that originates over a file icon in the first display region, enters a dynamically determined target zone, and causes an operation to be performed on the corresponding file in the second display region, according to one embodiment.

FIG. 5A illustrates pointer 302 initially touching region 106B at location 502. Location 502 is over file icon 504, and as such file icon 504 may become one of the parameters passed to an operation corresponding to manipulation gesture 518.

Figure 5B:
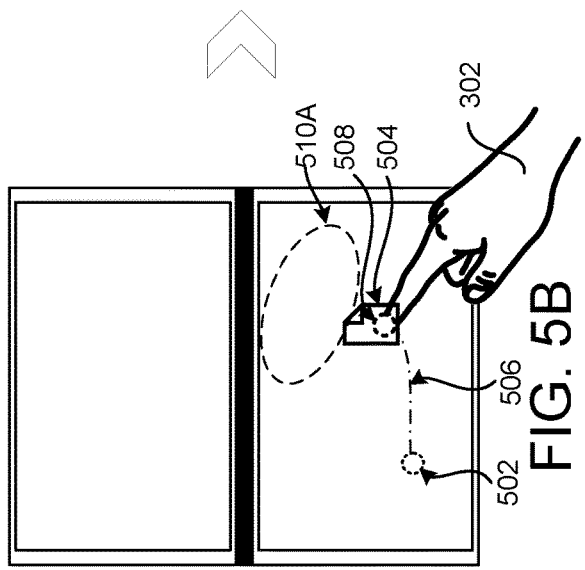

FIG. 5B illustrates pointer 302 having dragged file icon 504 along path 506 to location 508. In some embodiments, pointer 302 was initially dragged at a speed or with an acceleration slow enough to be considered a manipulation gesture. Once foldable device 301 determined that pointer 302 was moving at a speed and/or acceleration consistent with a manipulation gesture, foldable device 301 began moving file icon 504 along path 506 with pointer 302 in a one-to-one manner.

While pointer 302 is dragging file icon 504 along path 506, foldable device 301 may iteratively scan regions 106B and 106A (including region 106A itself) for destinations and/or potential operations consistent with path 506 and the current location of file icon 504. Similar to identifying a symbolic gesture as discussed above in conjunction with FIGS. 4A-4D, foldable device 301 may narrow the selection of destinations and/or operations based on the current (i.e. tangential) direction of path 506, potential destinations on or near path 506, potential destinations in the direction of path 506, the location of the edges of region 106B and of hinge 108, and the like.

As illustrated, path 506 has turned up towards hinge 108, and as such region 106A has been identified as a potential destination. Accordingly, foldable device 301 has created zone 510A as a location that file icon 504 may be dragged to in order to move file icon 504 to region 106A. The location, shape, and orientation of zone 510 may be determined based on a number of factors, including the speed and acceleration of the gesture, the direction the gesture is proceeding in—particularly when the direction is towards a potential target such as a hinge 108 or file folder, and a measure of linearity of the gesture—i.e. is there a clear dominant direction, as opposed to moving in a wavy or zig-zag fashion. Zone 510 may take on any shape, such as an oval, rectangle, or an irregular shape. Zone 510 may take on an irregular shape when other potential destinations would make an operation target ambiguous. For example, an otherwise rectangular zone 510 may have a circle cut out of one corner to prevent overlap between zone 510 and a file folder.

Figure 5C:
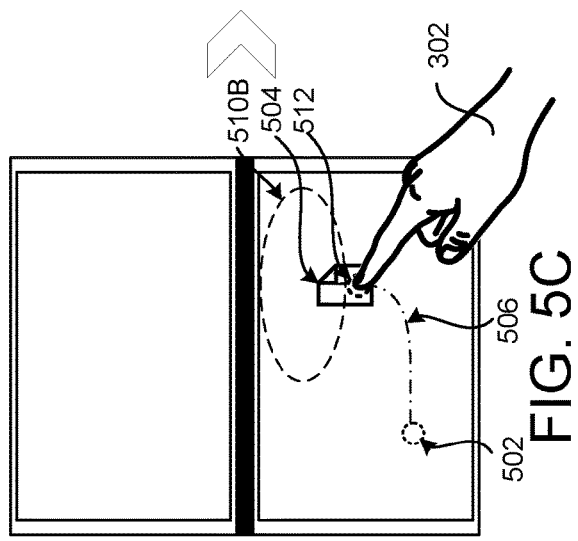

FIG. 5C illustrates pointer 302 having moved further along path 506, continuing an upturn towards region 106A. Accordingly, foldable device 301 has identified zone 510B such that if gesture 518 ends in zone 510B, foldable device 301 will move file icon 504 to region 106A.

Figure 5D:
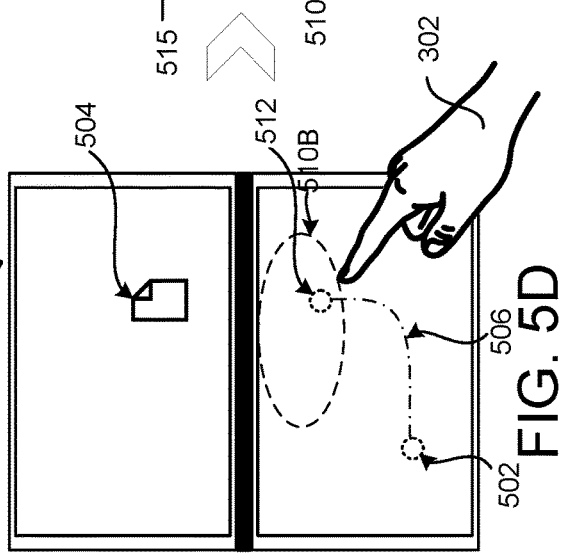
Figure 5E:
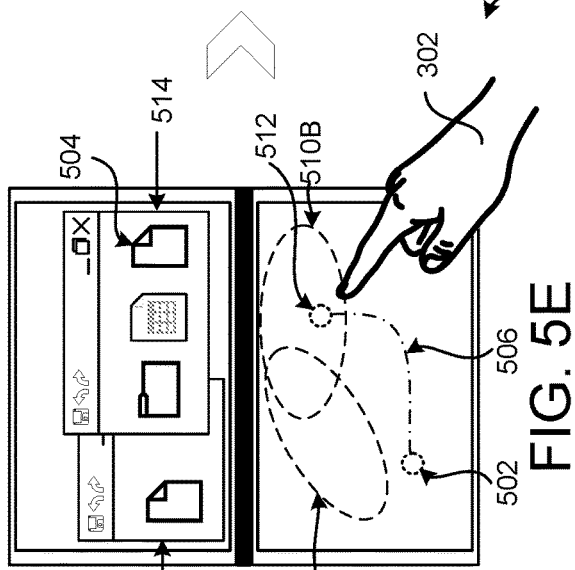
Figure 5F:
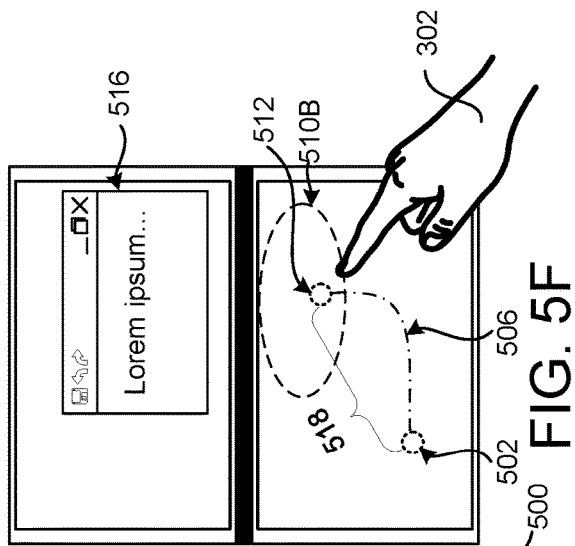

FIGS. 5D-5F illustrate three possible outcomes of dropping file icon 504 in zone 510B. FIG. 5D illustrates moving file icon 504 to region 106A, e.g. to the desktop of region 106A. In some configurations, manipulation gesture 518 may instead create a copy of the underlying file in region 106A and/or create a shortcut to an underlying file associated with file icon 504 in region 106A. Which action is performed may be determined by a user configuration, a default value, a command modifier, or the like.

Foldable device 301 may also be configured to perform a more complicated operation. For example, FIG. 5E illustrates moving file icon 504 to a file folder 514 that is open in region 106B. In some configurations, the existence of an open file folder 514 in region 106B causes the location and/or orientation of zone 510B to move in relation to the location and orientation depicted in FIG. 5D. For example, since folder 514 is positioned on the right side of region 106B, zone 510B may be shifted further to the right. FIG. 5E also depicts a second folder 515 in region 106B. A second zone 510C is active in response to folder 515.

FIG. 5F illustrates another operation foldable device 301 may perform on file icon 504 when manipulation gesture 518 ends in zone 510B: opening an application associated with file icon 504 in region 106A.

Figure 6:
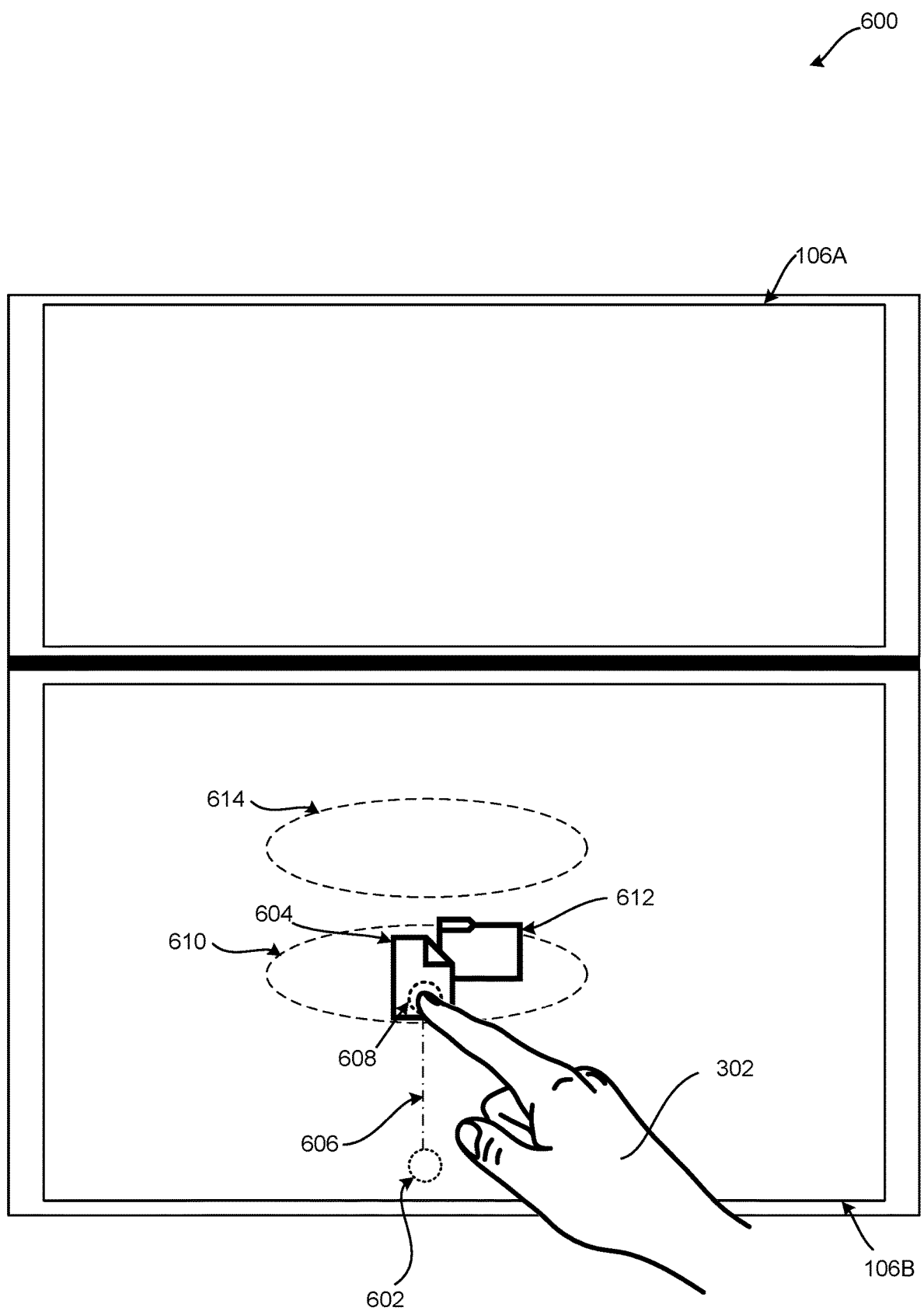
FIG. 6 is a device user interface diagram illustrating aspects of a dynamically determined target zone as a file icon is dragged over a potential destination in the first region, according to one embodiment.

FIG. 6 is a device user interface diagram 600 illustrating aspects of a dynamically determined target zone as file icon 604 is dragged over a potential destination 612 in region 106B. In some embodiments, FIG. 6 illustrates that pointer 302 began a manipulation gesture 606 of file icon 604 at location 602, dragging file icon 604 to location 608. If file folder 612 did not exist or was not located on the path of manipulation gesture 606, foldable device 301 may have enough confidence in the intended destination of file icon 604 to create zone 610.

However, the presence of file folder 612 as a possible destination of file icon 604 creates an ambiguity as to the intended destination of file icon 604. As such, foldable device 301 will create zone 614, beyond file folder 602 to remove any ambiguity. In another embodiment, zone 614 may be created closer to location 602 with a carve-out to avoid file folder 612. If manipulation gesture 606 continues to zone 614 where file icon 604 is dropped, foldable device 301 may perform one or more of the operations depicted in FIGS. 5D-5F as discussed above.

Figure 7:
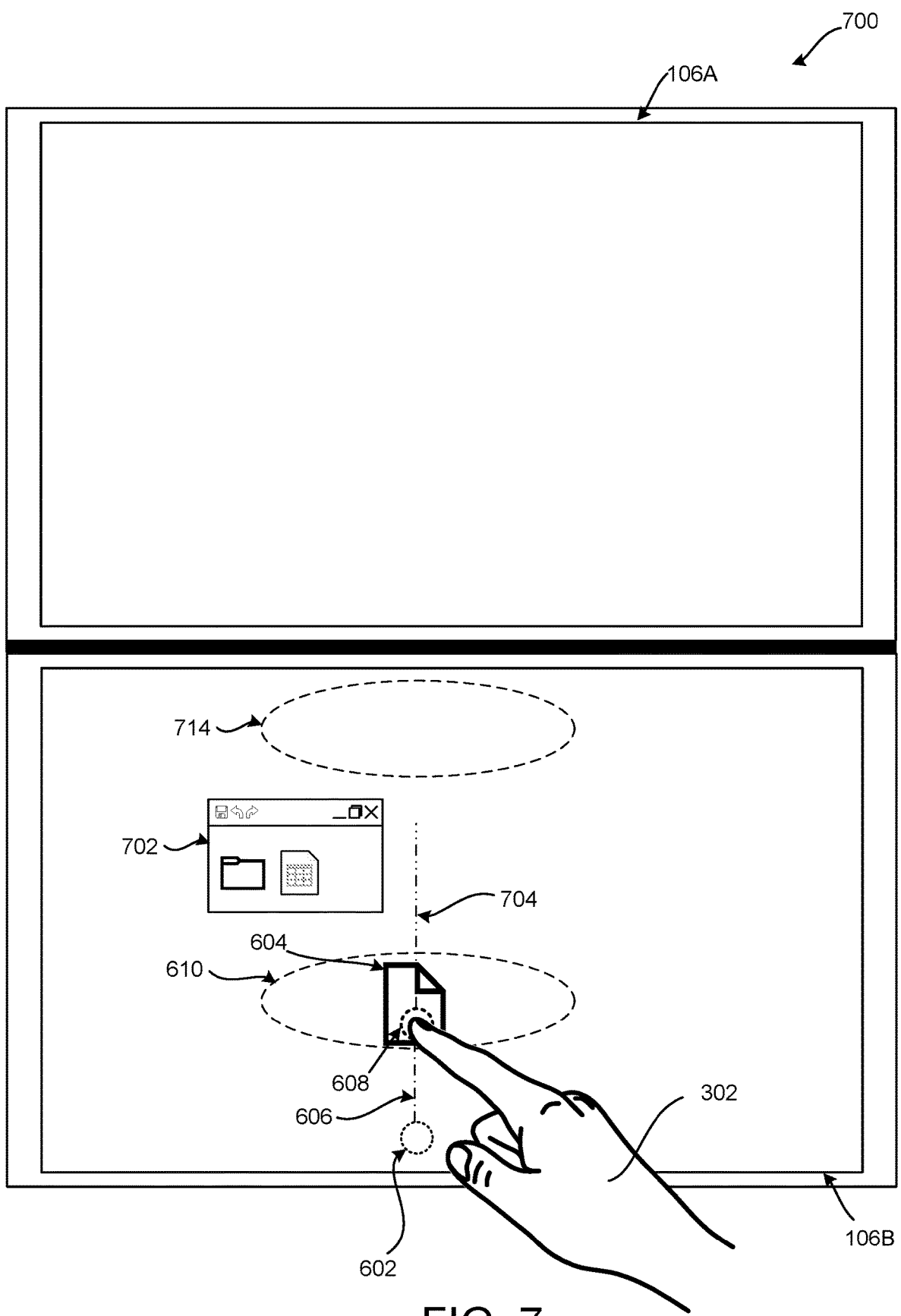
FIG. 7 is a device user interface diagram illustrating aspects of a dynamically determined target zone when a potential target exits along an anticipated gesture path, according to one embodiment.

FIG. 7 is a device user interface diagram 700 illustrating aspects of a dynamically determined target zone when a potential target 702 exits along an anticipated gesture path. In some configurations, open file folder 702 creates an ambiguity as to the predicted destination of file icon 604. While open file folder 702 is not on path 606 of file icon 604, nor is it adjacent to or near file icon 604, open file folder 702 is on an anticipated gesture path 704 of file icon 604.

Anticipated gesture path 704 may be determined based on a direction of file icon 604, i.e. a tangential direction vector at the time anticipated gesture path 704 is generated. Anticipated gesture path 704 may also be determined based on an overall direction of manipulation gesture 606.

Figure 8:
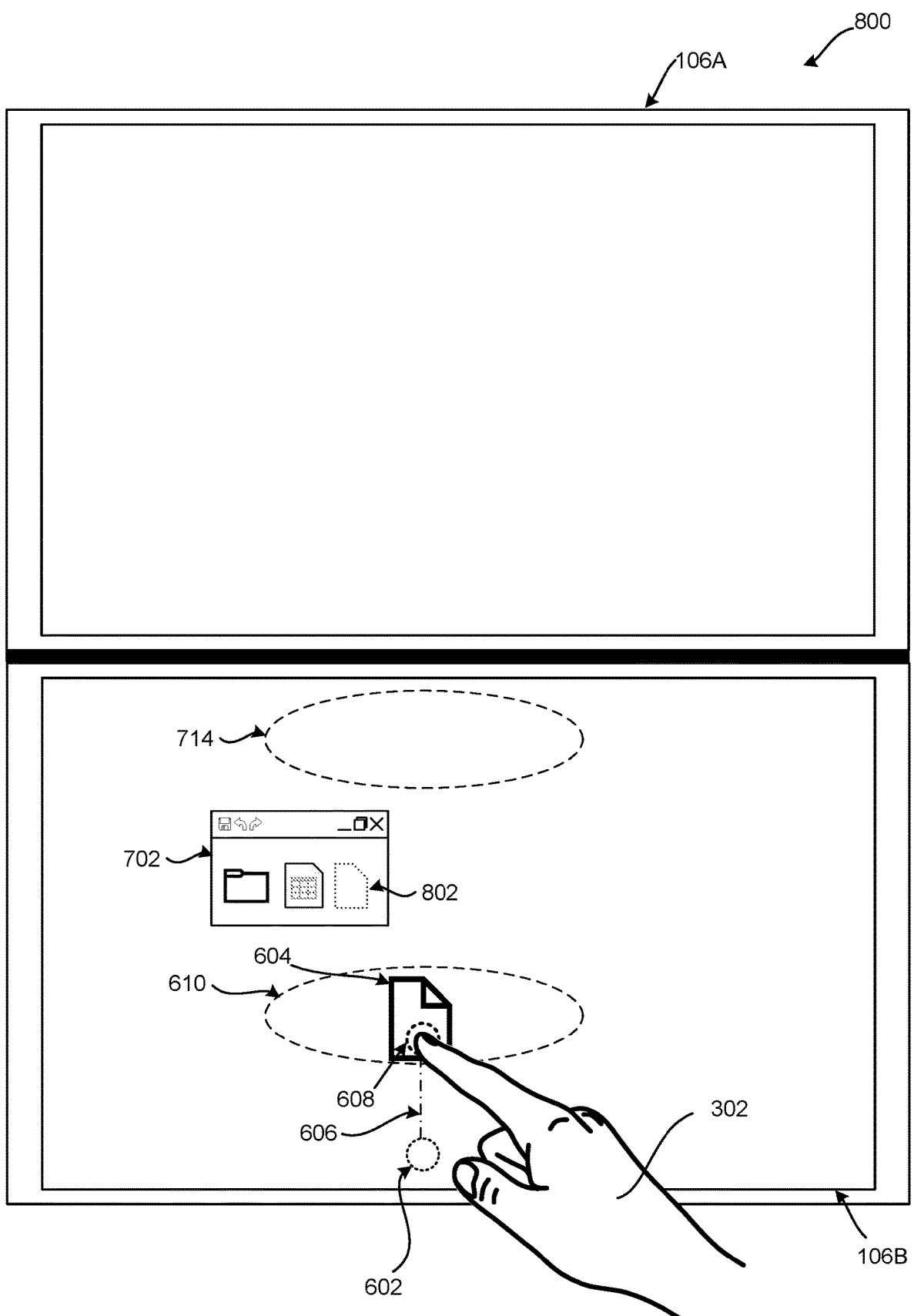
FIG. 8 is a device user interface diagram illustrating aspects of a prediction of an operation a user may perform based in part on an extrapolation of a gesture, according to one embodiment.

FIG. 8 is a device user interface diagram 800 illustrating aspects of a prediction 802 of an operation a user intends to perform based in part on an extrapolation of gesture 606. In some configurations, visual effect 802 is a prediction based on an extrapolation of gesture 606 similar to the determination of anticipated gesture path 704 discussed above in conjunction with FIG. 7. In some configurations, foldable device 301 creates visual effect 802 to preview what operation would be performed on file icon 604 if gesture 606 ended at the current location. As depicted, foldable device 301 is displaying that ending manipulation gesture 606 as is would invoke an operation that moves file icon 604 to open folder 702.

Visual effects are not necessarily shaped like the underlying UI items. For example, a visual effect indicating a predicted destination for file icon 604 may have the shape of a rectangle, not an outline of fie icon 604.

Furthermore, visual effects may change shape, location, and size to reflect greater or lesser confidence in a prediction. For example, the size of visual effect 802 may increase as gesture 606 approaches open folder 702, indicating an increasing confidence in the prediction.

Visual effects may also be used to convey that foldable device has interpreted a user intent, but that the particular target is invalid. For example, if open folder 702 was read-only, visual effect 802 may appear in open folder 702, but 'bounce', 'shake', or otherwise indicate through animation or other appearance that the moving file icon 604 to open folder 702 is invalid.

Figure 9:
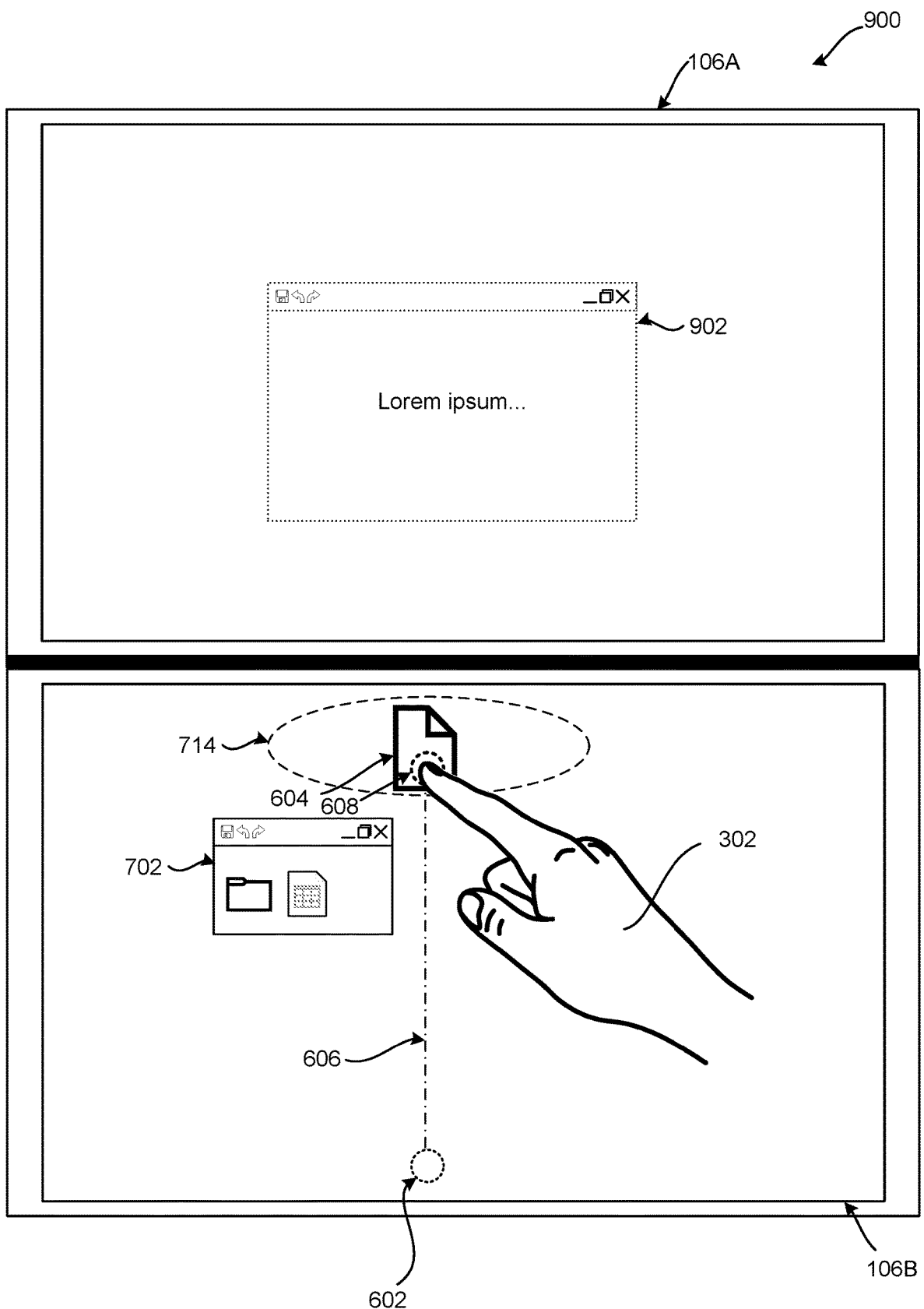
FIG. 9 is a device user interface diagram illustrating aspects of a prediction of an operation that a user intends to perform based in part on an analysis of a gesture, according to one embodiment.

In some configurations, foldable device 301 produces a visual pulse if, while performing a gesture, pointer 302 hovers over a particular manipulation zone FIG. 9 is a device user interface diagram 900 illustrating aspects of a prediction of an operation a user may perform based in part on an analysis of a gesture. In some embodiments, manipulation gesture 606 has continued past open folder 702, eliminating any potential ambiguity as to the destination of file icon 604 caused by open folder 702. Instead, pointer 302 has continued manipulation gesture 606 to zone 714, which is associated with an operation to open the file associated with file icon 604 in region 106A.

In some configurations, prediction 902 is a visual effect indicating what would happen to file icon 604 if manipulation gesture 606 ended in zone 714. In some configurations, prediction 902 outlines what an application used to open the file associated with file icon 604 would look like. For example, prediction 902 may include a location and a size of the application. In other embodiments, foldable device 301 may open the file associated with file icon 604 and display actual file contents in prediction 902.

Figure 10:
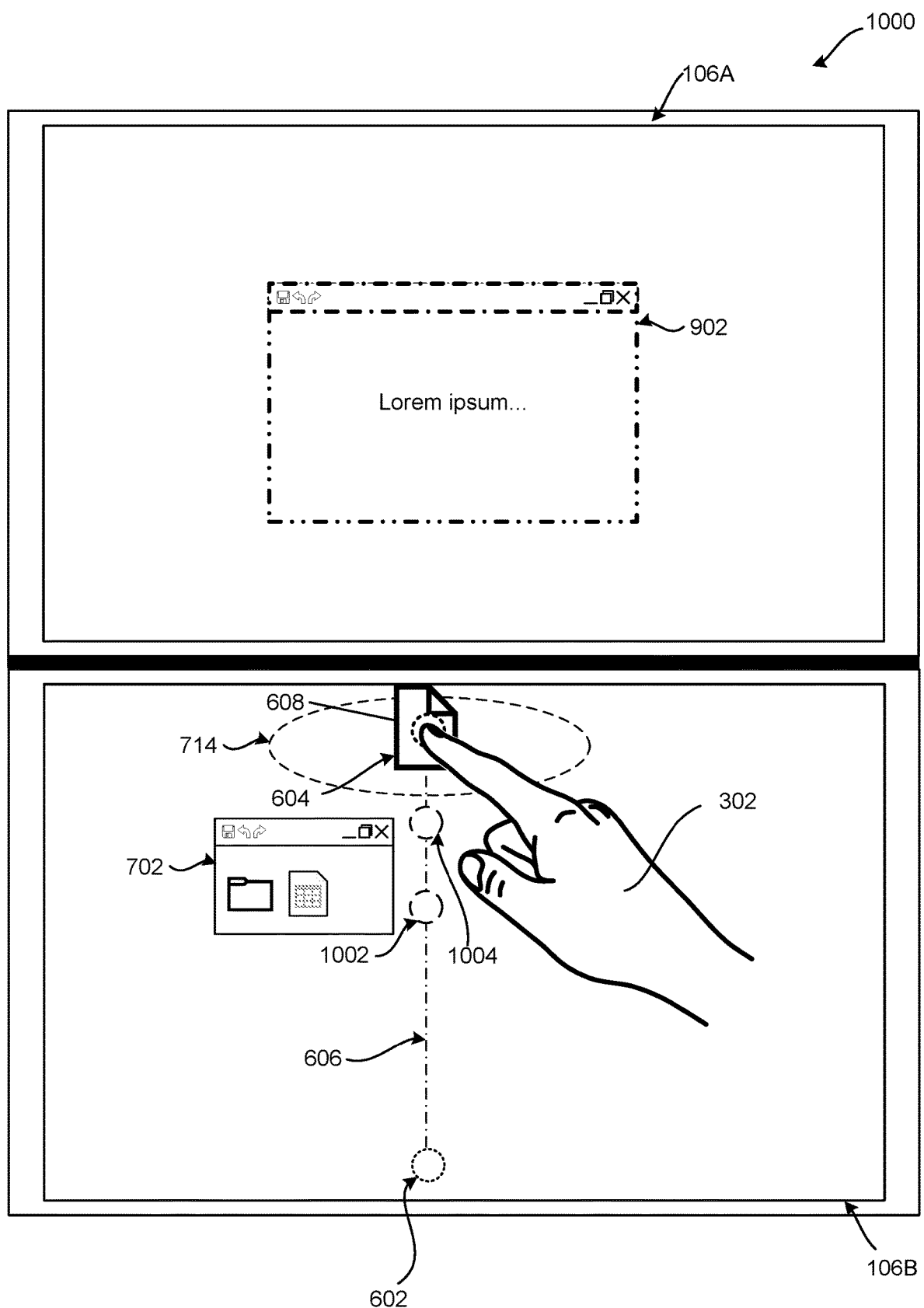
FIG. 10 is a device user interface diagram illustrating aspects of a depiction of an amount of confidence in a prediction of an operation a user may perform, according to one embodiment.

FIG. 10 is a device user interface diagram 1000 illustrating aspects of a depiction of an amount of confidence in a prediction 902 of an operation that a user may perform. In some configurations, confidence in the prediction 902 is indicated by highlighting, bolding, augmenting, or otherwise distorting the appearance of the application depicted in prediction 902. A darker, thicker color may indicate more confidence, although lighter, brighter colors may similarly be used to indicate more confidence in the prediction. Additionally, or alternatively, other visual indications such as line thickness, font weight, level of opacity, and similar visual cues may alert a user to higher or lower confidence in the predicted outcome of ending manipulation gesture 606.

In some configurations, foldable device 301 may indicate how the amount of confidence in the prediction 902 changes throughout the manipulation gesture. For example, prediction 902 may be progressively faded in, e.g. an outline made darker or a predicted rendering made opaquer, as foldable device 301 becomes more confident in the intention of the user. For example, once file icon 604 has been dragged from location 602 to location 1002, prediction 902 may be displayed as a light outline indicating a slight confidence that the user intends to drag icon 604 to zone 714. As file icon 604 is dragged further towards location 1004, the outline may be made darker, as confidence in zone 714 as a destination increases. If the file icon 604 were to be dragged away from zone 714, confidence in zone 714 as a destination decreases, and prediction 902 may be faded out accordingly.

Location 1002 is an example of a location where foldable device 301 may determine with slight confidence that file icon 604 will be dragged to zone 714, and as a result, display prediction 902 with a light outline. This determination may be based on the velocity and acceleration of pointer 302, the distance of location 1002 from other potential destinations like file folder 702, the distance that pointer 302 has traveled from location 602 to location 1002, the change in direction of the gesture over time, whether the gesture is moving towards a different display region, and the like.

Under different circumstances, foldable device 301 may have different levels of confidence at location 1002 that the gesture will end in zone 714. For example, if the average velocity of the gesture from location 602 to location 1002 was lower, then confidence in zone 714 as the destination may be lower, as the user may be indecisive, or the gesture may still turn left towards file folder 702. In this scenario, prediction 902 may not be displayed at all. Conversely, if the average velocity of the gesture was higher, foldable device 301 may have more confidence that the gesture will bypass file folder 702, and prediction 902 may be displayed with a darker outline or more opaque predicted rendering.

The distance the gesture has traveled so far is another factor. If the gesture had not traveled as great a distance—i.e. if location 602 was closer to location 1002—then foldable device 301 may have less confidence in the overall direction of the gesture. If there is less confidence in the direction of the gesture, then foldable device 301 may have less confidence that zone 714 is the destination.

Foldable device 301 may have greater confidence that the gesture will end in location 714 when it has less confidence that the gesture will end in file folder 702. Foldable device 301 may calculate that the gesture will not end in file folder 702 based on the factors listed above for predicting that the gesture will end in zone 714. For example, the distance from location 602 to location 1002, the consistency of the direction of the gesture, whether and to what extent the direction of the gesture is moving towards file folder 702, whether the gesture has meaningfully slowed more than a defined amount while approaching file folder 702, etc.

In some configurations, foldable device 301 may display multiple predictions of where the gesture will end. For example, foldable device 301 may detect two possible destinations for file icon 604 with enough confidence to display a prediction—file folder 702 and zone 714. In this case, foldable device 301 may display prediction 802 within file folder 702 and prediction 902 within region 106A. As the gesture continues, confidence in one or more of the predictions may increase, decrease, or stay the same, causing the predictions to be emphasized, de-emphasized, or remain unchanged, accordingly.

In some configurations, confidence in the prediction 902 is interpreted based on how directly manipulation gesture arrived at zone 714. Directly arriving at zone 714 may engender more confidence in the prediction than if manipulation gesture 606 wended around in multiple directions before encountering zone 714. Another basis for a confidence score as to prediction 902 is how far into zone 714 pointer 302 has traveled—just grazing the surface of zone 714 may provide less confidence than entering the center of zone 714. Another basis for a confidence score is whether the speed and acceleration of pointer 302 suggests that pointer 302 may slow down and remain in zone 714 (increase confidence) or whether the speed and acceleration of pointer 302 may speed up and/or pass through zone 714 (decrease confidence).

FIGS. 11A-11D are device user interface diagrams 1100 illustrating aspects of symbolic 'flick' gestures. In some configurations, foldable device 301 is oriented in landscape mode, turning each individual region into a portrait mode.

Figure 11B:
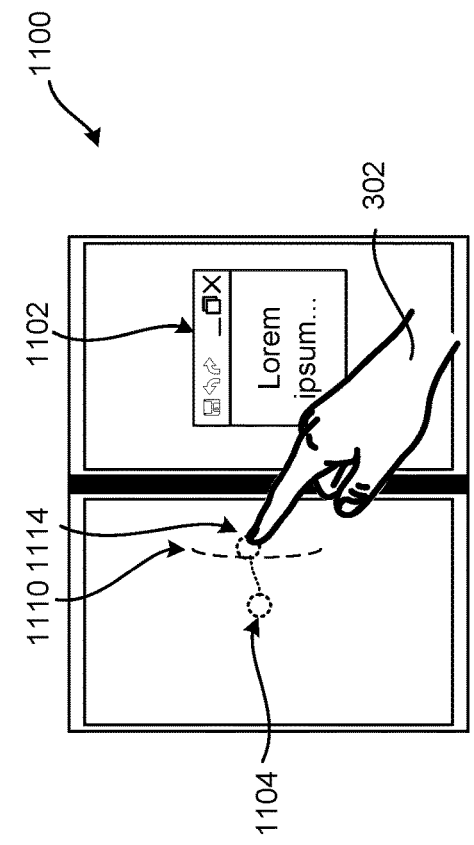
FIGS. 11A-11D are device user interface diagrams illustrating aspects of symbolic 'flick' gestures, according to one embodiment.
Figure 11D:
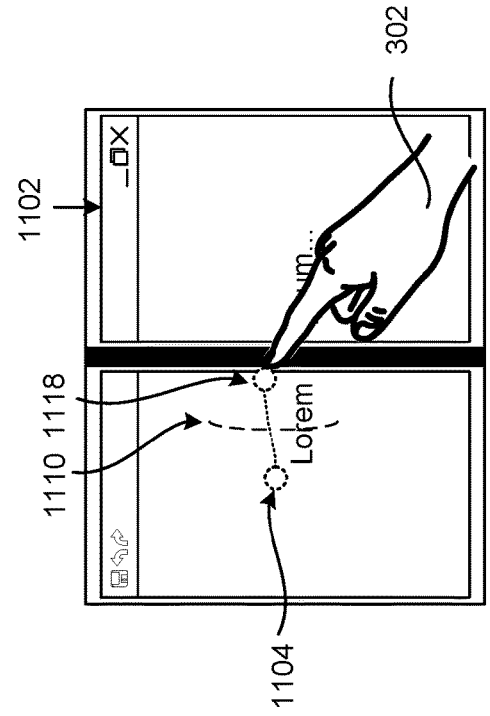
Figure 11A:
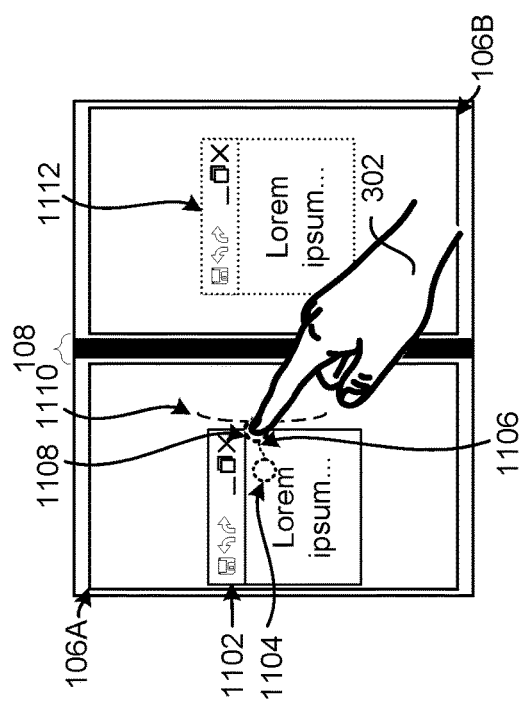

FIG. 11A illustrates that pointer 302 has pressed location 1104 of region 106A and slid to location 1108 of region 106A. Pointer 302 has moved away from location 1104 with enough speed and acceleration for foldable device 301 to identify the movement as a symbolic gesture. Different speeds and lengths of symbolic gesture 1108 may be associated with different operations. FIG. 11A also illustrates another example of a prediction 1112 of the outcome of the operation associated with symbolic gesture 1108.

FIG. 11B illustrates symbolic gesture 1108 crossing threshold 1110, after which pointer 302 lifts up from region 106A at location 1114. Foldable device 301 may then calculate an average velocity of the symbolic gesture and a distance traveled by the symbolic gesture. Speed and distance of a symbolic gesture may be used to distinguish different gestures, each of which may be associated with a different operation. For example, FIG. 11B illustrates that when symbolic gesture 1108 ends at location 1114, the operation performed moves window 1102 to region 106B.

Figure 11C:
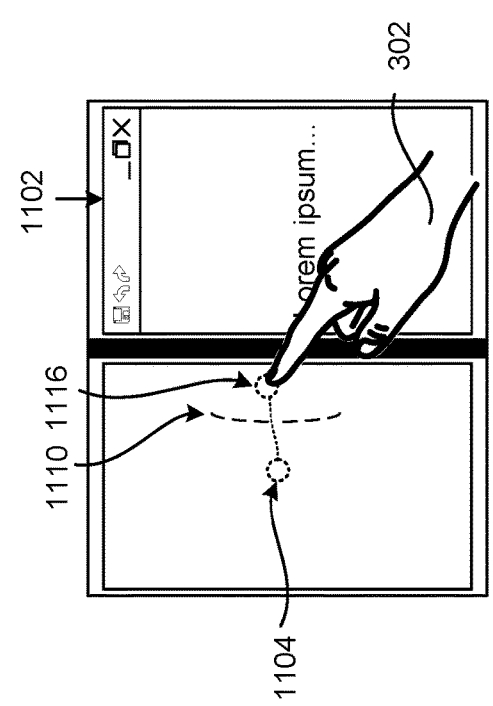

FIG. 11C illustrates symbolic gesture 1108 crossing threshold 1110, after which pointer 302 lifts up from region 106A at location 1116. In some configurations, location 1116 is further away from location 1104 than location 1114. Foldable device 301 may then calculate an average velocity of the symbolic gesture and a distance traveled by the symbolic gesture. As discussed above in conjunction with FIG. 1B, speed and distance of a symbolic gesture may be used to distinguish different operations associated with the gesture. For example, FIG. 11C illustrates that when symbolic gesture 1108 ends at location 1116, the operation performed moves window 1102 to region 106B and maximizes window 1102 to the entire region 106B. Associating an operation to move and maximize window 1102 with a longer gesture may be intuitive to a user, as moving and maximizing is doing more than just moving.

FIG. 11D illustrates symbolic gesture 1108 crossing threshold 1110 and proceeding to location 1118, which is even further from location 1104. The operation corresponding to the even longer symbolic gesture is to move window 1102 to region 106B and cause window 1102 to span both regions 106A and 106B.

Figure 12:
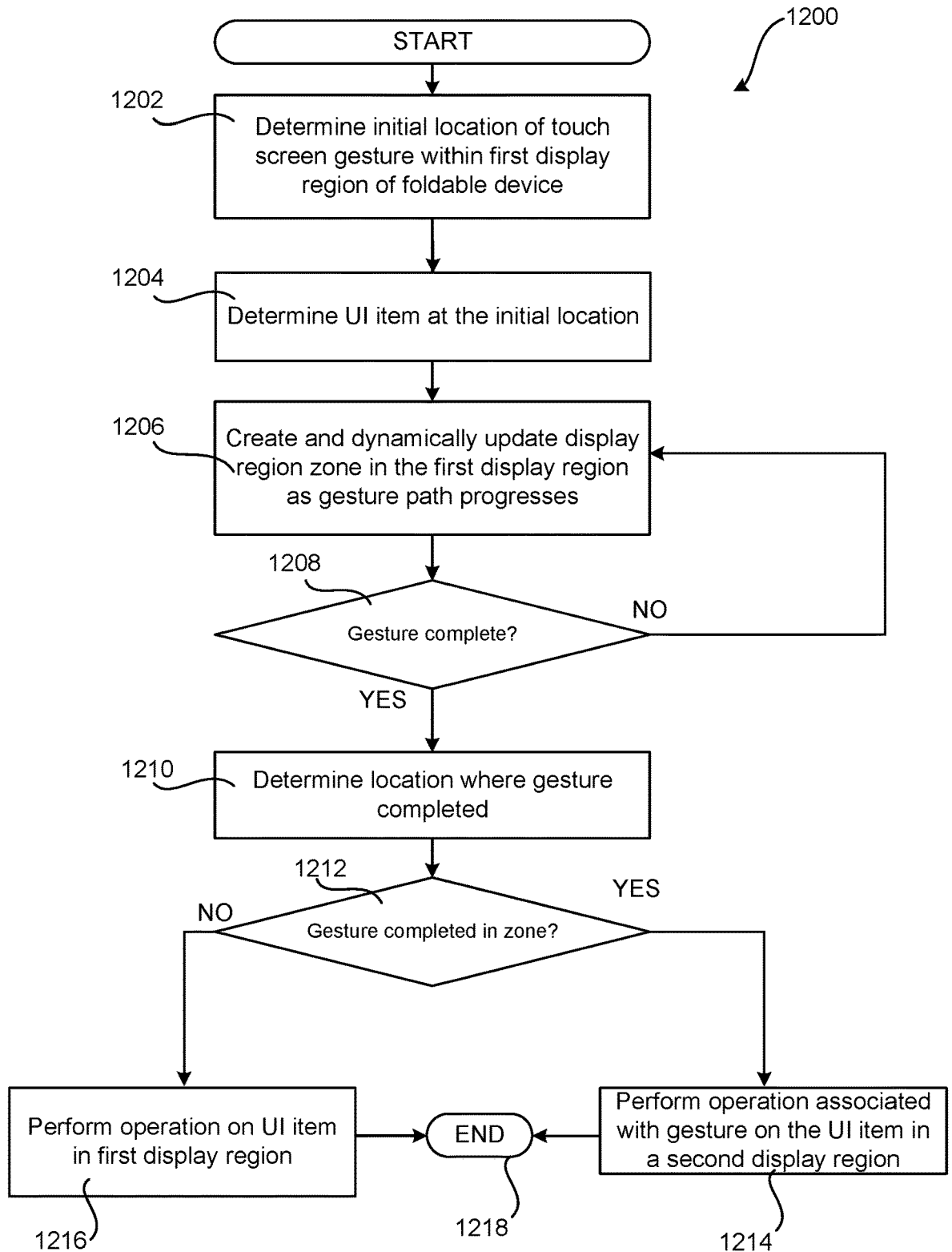
FIG. 12 is a flow diagram showing a routine that illustrates aspects of the operation of a foldable computing device for predictive gesture optimizations for moving objects across display boundaries, according to one embodiment.

FIG. 12 is a flow diagram showing a routine 1200 that illustrates aspects of the operation of a foldable computing device 102 for predictive gesture optimizations for moving objects across display boundaries. The routine 1200 begins at operation 1202, where a foldable device 301 determines an initial location 502 of a touch screen gesture 518 within a first region 106A of the foldable device 301, in the manner described above. The routine 1200 then proceeds to operation 1204, where the foldable computing device 102 determines a UI item 504 at the initial location 502, in the manner described above.

The routine 1200 then proceeds to operation 1206, where the foldable device 301 creates and dynamically updates zone 510 in display region 106A as gesture 518 progresses, in the manner described above. The routine 1200 then proceeds to operation 1208, where the foldable device 301 determines if gesture 518 is complete, in the manner described above. If foldable device 301 determines that gesture 518 is not complete, the routine 1200 proceeds to operation 1206. If foldable device 301 determines that gesture 518 is complete, the routine 1200 proceeds to operation 1210 where foldable device 301 determines a location 512 where gesture 518 was completed, in the manner described above.

From operation 1210, the routine 1200 proceeds to operation 1212 where foldable device 301 determines if gesture 518 was completed in zone 510, in the manner described above. If foldable device 301 determines that gesture 518 was not completed in zone 510, then the routine 1200 proceeds to operation 1216, where foldable device 301 performs an operation on UI item 504 in the first display region 106A, in the manner described above. However, if foldable device 301 determines that gesture 518 was completed in zone 510 of region 106A, the routine 1200 proceeds to operation 1214, where foldable device 301 performs an operation associated with gesture 518 on the UI item 504 in display region 106B, in the manner described above.

The routine 1200 then proceeds to operation 1218, where it ends.

Compound Symbolic and Manipulation Gesture Language for Multi-Screen Windowing

Figure 13B:
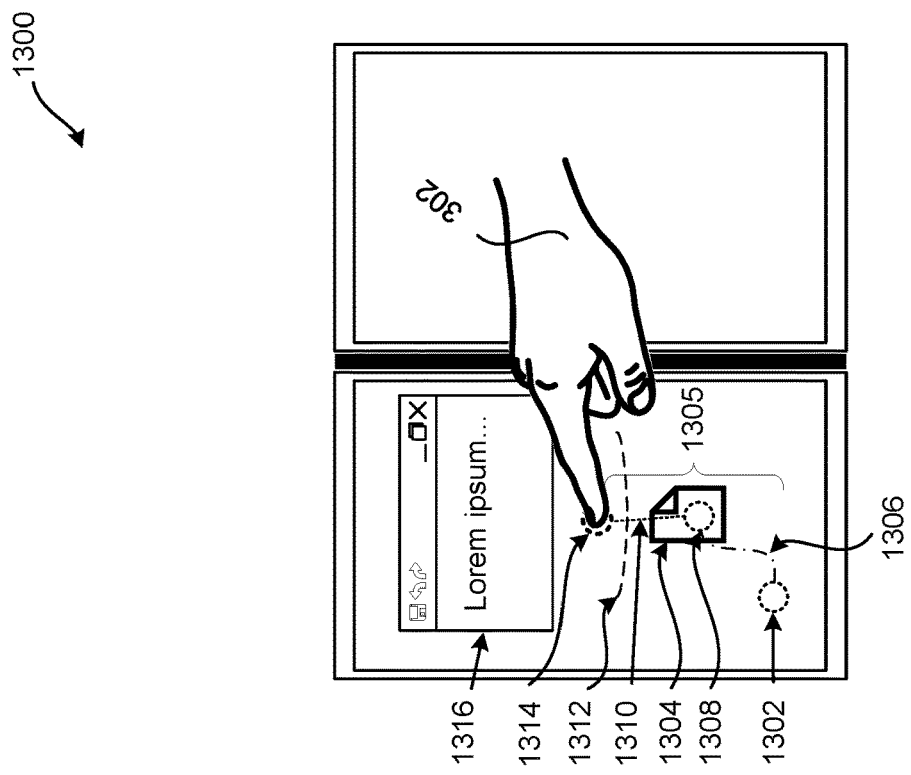
FIGS. 13A and 13B are device user interface diagrams illustrating aspects of a combination of manipulation gesture and symbolic gesture used to open a document, according to one embodiment.
Figure 13A:
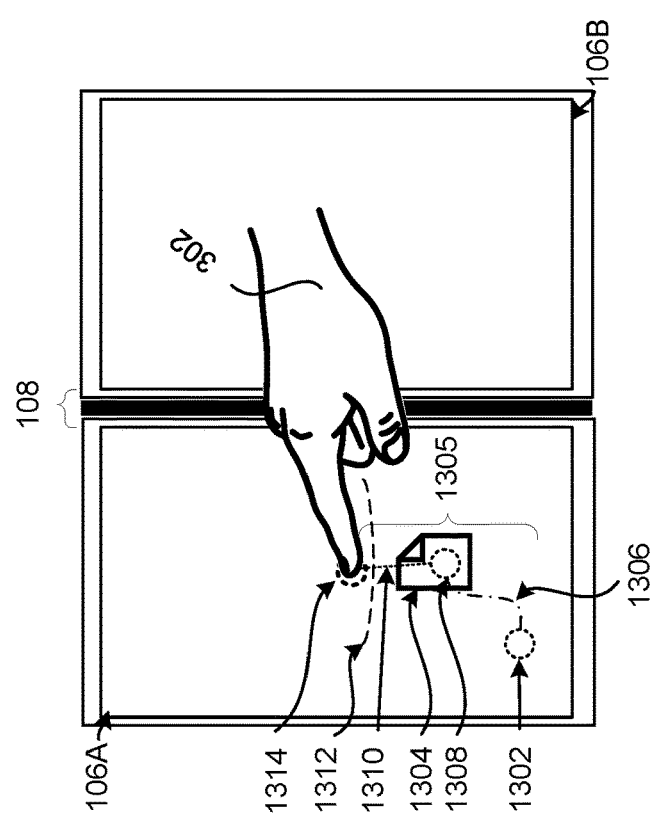

FIGS. 13A and 13B are device user interface diagrams 1300 illustrating aspects of a combination of manipulation gesture 1306 and symbolic gesture 1310 used to open a document 1304. Manipulation gestures and symbolic gestures may be combined to perform more advanced, complex gestures. For example, if a user is dragging a window, and quickly flicks down, foldable device 301 may minimize the window to a taskbar associated with the region the flick started in—regardless of where the window was originally located. Similarly, a drag and drop manipulation gesture of a window may be punctuated with a flick across, moving the window to an adjacent region.

In another embodiment, a drag and drop manipulation gesture may be punctuated with a flick up, maximizing the window in the region where the flick occurred, not necessarily where the window was located before the manipulation gesture. In this way, a context created by the manipulation gesture is applied as a modifier when interpreting the symbolic gesture. Other examples of symbolic gestures include flicking up to open a new instance of an application. Opening a new instance of an application may also be applied to an icon on a desktop or to an icon in a taskbar that represents an already running instance of an application.

FIG. 13A illustrates pointer 302 having touched location 1302 on region 106A of foldable device 301 to begin a compound gesture 1305. Document icon 1304 was originally located at location 1302 but was moved by manipulation gesture component 1306 of compound gesture 1305 to location 1308 where manipulation gestured component 1306 ended and symbolic gesture component 1310 of compound gesture 1305 began. Pointer 302 is depicted as having swiped up past threshold 1312 to location 1314 while performing symbolic gesture component 1310.

FIG. 13B illustrates pointer 302 released from region 106A, completing symbolic gesture component 1310 as well as the compound gesture 1305 comprising manipulation gesture component 1306 and symbolic gesture component 1310. The operation associated with symbolic gesture component 1310 is to open the document associated with document icon 1304 in region 106A, i.e. the region where symbolic gesture 1310 began. Although FIG. 13 depicts symbolic gesture component 1310 crossing threshold 1312, it is similarly contemplated that manipulation gesture component 1306 may cross threshold 1312 while symbolic gesture component 1310 is used to determine or modify the operation to be performed in the display region 106A.

Figure 14B:
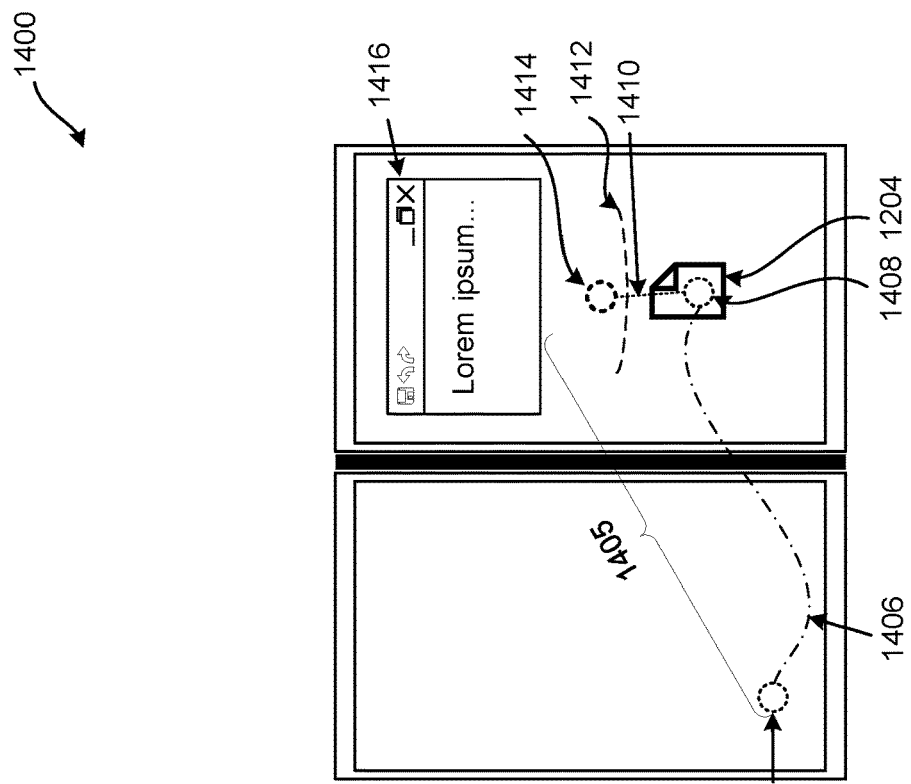
FIGS. 14A and 14B are device user interface diagrams illustrating aspects of a combination of manipulation gesture and symbolic gesture used to open a document on a different display region, according to one embodiment.
Figure 14A:
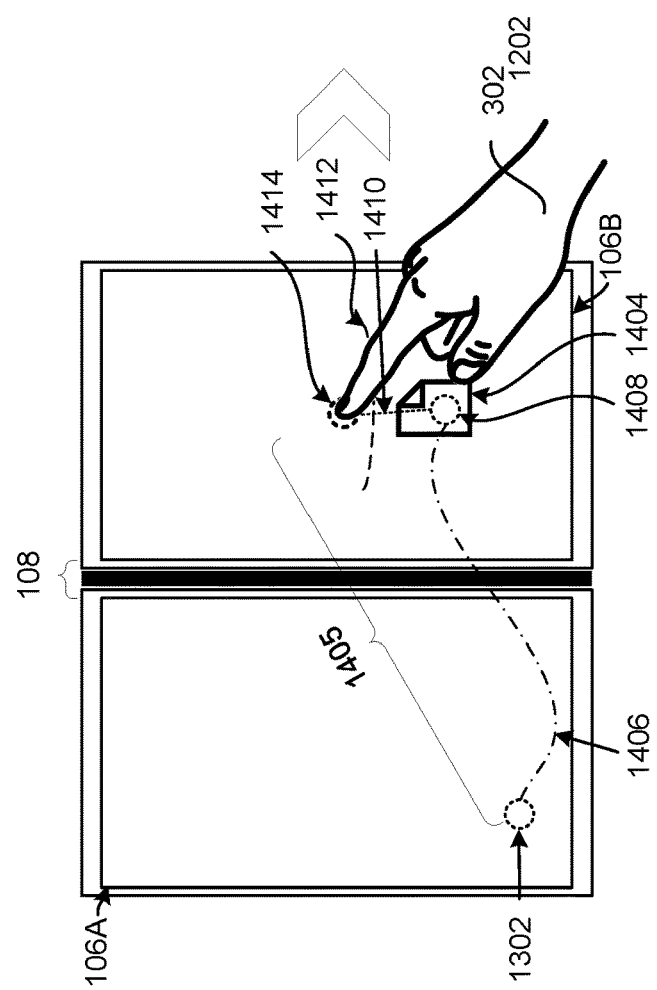

FIGS. 14A and 14B are device user interface diagrams 1400 illustrating aspects of a combination of manipulation gesture component 1406 and symbolic gesture component 1410 of compound gesture 1405 used to open a document 1404 on a different display region 106B.

FIG. 14A illustrates pointer 302 having touched location 1302 on region 106A of foldable device 301 to begin manipulation gesture component 1406 of compound gesture 1405. Document icon 1404 was originally located at location 1302 but was moved by manipulation gesture component 1406 to location 1408 in region 106B. At location 1408, the compound gesture 1405 transitioned from manipulation gestured component 1406 to symbolic gesture component 1410. In some configurations, the end of manipulation gesture component 1406 and the beginning of symbolic gesture component 1410 is identified based on a change of direction, speed, and/or acceleration beyond a defined threshold. Pointer 302 is depicted as having swiped up past threshold 1412 to location 1414 while performing symbolic gesture component 1410.

FIG. 14B illustrates pointer 302 released from region 106B, completing symbolic gesture component 1410 as well as the compound gesture 1405 comprising manipulation gesture component 1406 and symbolic gesture component 1410. The operation associated with symbolic gesture component 1410 is to open the document associated with document icon 1404 in region 106B, i.e. the region where symbolic gesture component 1410 began.

Figure 15:
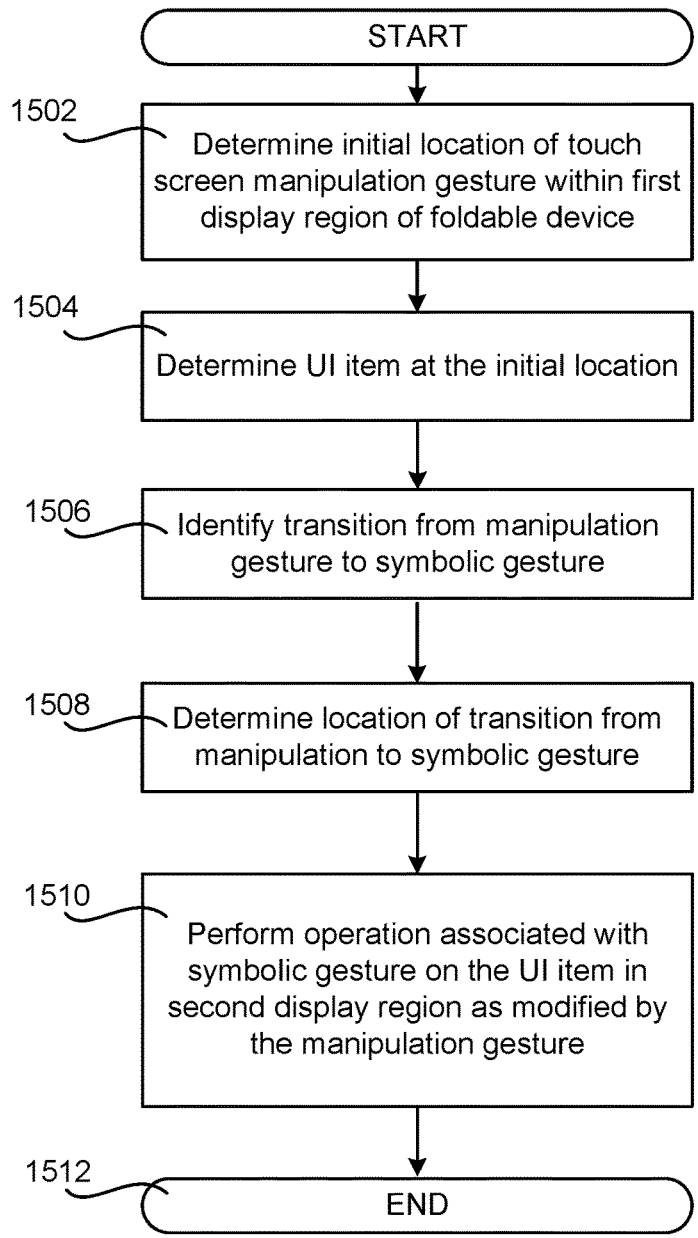
FIG. 15 is a flow diagram showing a routine that illustrates aspects of compound symbolic and manipulation gesture language for multi-screen windowing, according to one embodiment.

FIG. 15 is a flow diagram 1500 showing a routine that illustrates aspects of compound symbolic and manipulation gesture language for multi-screen windowing. The routine 1500 begins at operation 1502, where a foldable device 301 determines an initial location 1302 of a touch screen manipulation gesture 1406 within a first region 106A of the foldable device 301, in the manner described above. The routine 1500 then proceeds to operation 1504, where the foldable computing device 102 determines a UI item 1404 at the initial location 1302, in the manner described above.

From operation 1504, the routine 1500 proceeds to operation 1506, where the foldable device 301 identifies a transition from the manipulation gesture component 1406 to a symbolic gesture component 1410, in the manner described above. The routine 1500 then proceeds to operation 1508, where the foldable device 301 determines a location on region 106A or 106B at which the manipulation gesture 1406 transitioned to the symbolic gesture component 1410, in the manner described above.

From operation 1508, the routine 1500 proceeds to operation 1510, where the foldable device 301 performs an operation associated with symbolic gesture component 1410 on the UI item 1404. The operation selected may be modified by the manipulation gesture component 1406, e.g. the location of the transition from the manipulation gesture component 1406 to the symbolic gesture component 1410 may affect the command applied to UI item 1404 by the symbolic gesture component 1410. For instance, if manipulation gesture component 1406 began in region 106A and transitioned to symbolic gesture component 1410 in region 106B, the effect of the symbolic gesture component 1410 may be different than if the transition to symbolic gesture component 1410 occurred in region 106A. For instance, the region 106 in which the transition occurred may determine which region a window is maximized within. The routine 1500 then proceeds to operation 1512, where it ends.

Figure 16:
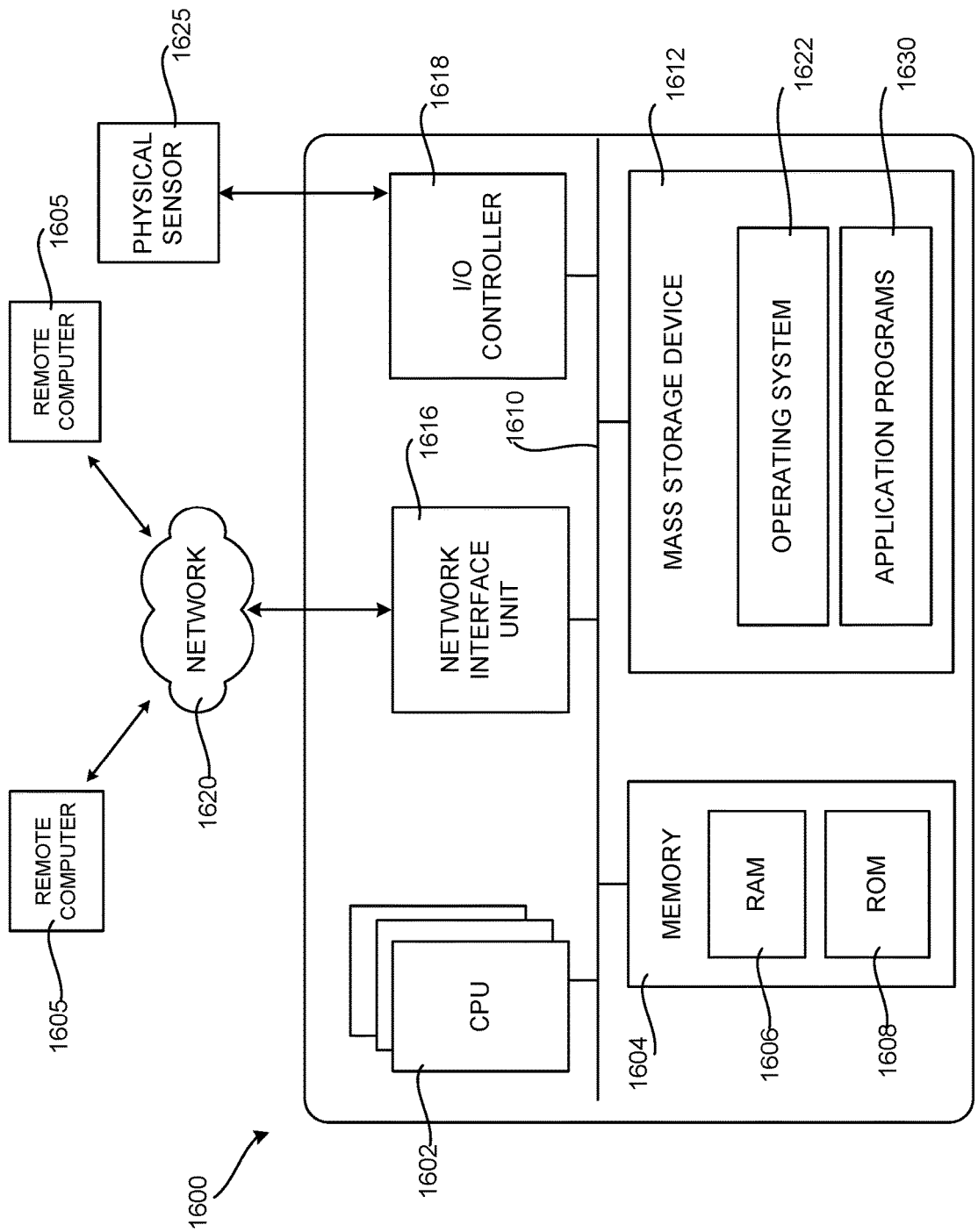
FIG. 16 is a computer architecture diagram showing an illustrative computer hardware and software architecture for a computing device that can implement aspects of the technologies presented herein.

FIG. 16 is a computer architecture diagram showing an illustrative computer hardware and software architecture for a computing device that can implement the various technologies presented herein. In particular, the architecture illustrated in FIG. 16 can be utilized to implement the hinged devices 102 and bendable devices 202 described herein. The illustrated architecture can also be utilized to implement other types of computing systems.

The computer 1600 illustrated in FIG. 16 includes a central processing unit 1602 ("CPU"), a system memory 1604, including a random-access memory 1606 ("RAM") and a read-only memory ("ROM") 1608, and a system bus 1610 that couples the memory 1604 to the CPU 1602. A basic input/output system ("BIOS" or "firmware") containing the basic routines that help to transfer information between elements within the computer 1600, such as during startup, can be stored in the ROM 1608. The computer 1600 further includes a mass storage device 1612 for storing an operating system 1622, application programs 1630, and other types of programs. The functionality described above is implemented by one or more of these programs in various configurations. The mass storage device 1612 can also be configured to store other types of programs and data.

The mass storage device 1612 is connected to the CPU 1602 through a mass storage controller (not shown) connected to the bus 1610. The mass storage device 1612 and its associated computer readable media provide non-volatile storage for the computer 1600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1600. For purposes of the claims, the phrase "computer storage medium," and variations thereof, does not include waves or signals per se or communication media.

According to various configurations, the computer 1600 can operate in a networked environment using logical connections to remote computers through a network such as the network 1620. The computer 1600 can connect to the network 1620 through a network interface unit 1616 connected to the bus 1610. It should be appreciated that the network interface unit 1616 can also be utilized to connect to other types of networks and remote computer systems. The computer 1600 can also include an input/output controller 1618 for receiving and processing input from a number of other devices, including a keyboard, mouse, touch input, a digital pen, or a physical sensor such as cameras and biometric sensors.

The computer 1600 can also be configured with a suitable video output device that can provide output to one or more display screens, such as those described above. One or more of the displays can be a touch-sensitive display that is configured to detect the presence and location of a touch. Such a display can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen is incorporated on top of a display as a transparent layer to enable a user to use one or more touches to interact with objects or other information presented on the display.

A touch-sensitive display can be configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims.

In some configurations, the computer 1600 supports a tap gesture in which a user taps a display once. A double tap gesture in which a user taps a display twice can also be supported. The double tap gesture can be used for various reasons including, but not limited to, zooming in or zooming out in stages. In some configurations, the computer 1600 supports a tap and hold gesture in which a user taps and maintains contact for at least a pre-defined time. The tap and hold gesture can be used for various reasons including, but not limited to, opening a context-specific menu.

In some configurations, the computer 1600 supports a pan gesture in which a user places a finger on a display and maintains contact with display while moving their finger. The pan gesture can be used for various reasons including, but not limited to, moving through screens, images, or menus at a controlled rate. Multiple finger pan gestures are also contemplated.

In some configurations, the computer 1600 supports a flick gesture in which a user swipes a finger in the direction the user wants the screen to move. The flick gesture can be used for various reasons including, but not limited to, scrolling horizontally or vertically through menus or pages. In some configurations, the computer 1600 supports a pinch and stretch gesture in which a user makes a pinching motion with two fingers (e.g., thumb and forefinger) or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as digital pens can be used to interact with the computing device 1600. As such, the above gestures should be understood as being illustrative and should not be construed as being limiting in any way.

It should be appreciated that the software components described herein, when loaded into the CPU 1602 and executed, can transform the CPU 1602 and the overall computer 1600 from a general-purpose computing device into a special-purpose computing device customized to facilitate the functionality presented herein. The CPU 1602 can be constructed from any number of transistors or other discrete circuit elements, which can individually or collectively assume any number of states. More specifically, the CPU 1602 can operate as a finite-state machine, in response to executable instructions contained within the software modules disclosed herein. These computer-executable instructions can transform the CPU 1602 by specifying how the CPU 1602 transitions between states, thereby transforming the transistors or other discrete hardware elements constituting the CPU 1602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1600 in order to store and execute the software components presented herein. It also should be appreciated that the architecture shown in FIG. 16 for the computer 1600, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 1600 might not include all of the components shown in FIG. 16, can include other components that are not explicitly shown in FIG. 16, or can utilize an architecture completely different than that shown in FIG. 16.

It should be appreciated that the computing architecture shown in FIG. 16 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Example 1: A computer-implemented method performed by a foldable computing device, comprising: identifying a beginning of a user interface gesture in a first display region of the foldable computing device, wherein the user interface gesture is associated with a user interface item, and wherein the foldable computing device comprises a second display region; detecting an end of the user interface gesture in the first display region of the foldable computing device; and in response to the user interface gesture beginning and ending in the first display region, performing an operation associated with the user interface item and the second display region.

Example 2: The computer-implemented method of Example 1, further comprising: defining a gesture target zone within the first display region; if the user interface gesture ends within the gesture target zone, performing the operation; and if the user interface gesture ends in the first display region outside of the gesture target zone, performing a different operation associated with the first display region or no operation at all.

Example 3: The computer-implemented method of Example 2, further comprising: during the gesture, when the gesture is within the gesture target zone, displaying a visual effect in the second display region that visualizes the operation that would be performed if the gesture ended.

Example 4: The computer-implemented method of Example 2, further comprising: dynamically adjusting a location, size, orientation, or shape of the gesture target zone during the user interface gesture based on a location, direction, or speed of the user interface gesture.

Example 5: The computer-implemented method of Example 4, wherein the gesture target zone is moved closer to the beginning of the user interface gesture when the speed of the user interface gesture is determined to exceed a defined threshold.

Example 6: The computer-implemented method of Example 2, wherein a location, size, or shape of the gesture target zone is determined based in part on a location of the beginning of the user interface gesture and a location of the second display region.

Example 7: The computer-implemented method of Example 2, wherein the operation is performed in response to the user interface gesture entering the gesture target zone and before the user interface gesture had ended.

Example 8: A foldable computing device, comprising: one or more processors; and at least one non-transitory computer-readable storage medium having computer-executable instructions stored thereupon which, when executed by the one or more processors, cause the foldable computing device to: identify a beginning of a user interface gesture in a first display region of the foldable computing device, wherein the user interface gesture is associated with a user interface item, and wherein the foldable computing device comprises a second display region; after the gesture has started, determine a threshold on the first display region based on a beginning location of the user interface gesture and a location of the second display region; determine that the user interface gesture crossed the threshold; detect an end of the user interface gesture within the first display region; and in response to determining that the user interface gesture crossed the threshold and ended in the first display region, perform an operation associated with the user interface item and the second display region.

Example 9: The foldable computing device of Example 8, wherein the operation associated with the second display region is performed in response to the user interface gesture being performed in less than a defined amount of time.

Example 10: The foldable computing device of Example 8, wherein the foldable computing device has a posture based on an orientation of the first display region to the second display region, and wherein the operation associated with the second display region is selected in part based on the posture.

Example 11: The foldable computing device of Example 8, wherein a size, shape, or position of the threshold is dynamically updated during the user interface gesture based on at least one of a location, direction, or speed of the user interface gesture or a historical location, direction, or speed of the user interface gesture.

Example 12: The foldable computing device of Example 8, wherein the threshold is made visible on the first display region when the user interface gesture has traversed towards the threshold at least a defined percentage of a distance between the beginning of the user interface gesture and the threshold.

Example 13: The foldable computing device of Example 8, further comprising: determining whether the second display region comprises a user interface gesture target; and setting a location of the threshold closer to the beginning of the user interface gesture when the second display region comprises the user interface gesture target.

Example 14: The foldable computing device of Example 8, further comprising: identifying a plurality of gesture targets in the second display region; defining a threshold in the first display region for each of the plurality of gesture targets; and selecting the operation based on which of the plurality of thresholds the user interface gesture crosses.

Example 15: The foldable computing device of Example 14, wherein the user interface gesture is pointed towards two or more of the plurality of gesture targets, wherein one of the two or more of the plurality of gesture targets is closer to the user interface gesture and one of the two or more of the plurality of gesture targets is further from the user interface gesture, wherein the closer gesture target is selected when a velocity of the gesture falls below a defined threshold, and wherein the further gesture target is selected when the velocity of the gesture exceeds the defined threshold.

Example 16: A non-transitory computer-readable storage medium having computer-executable instructions stored thereupon which, when executed by a foldable computing device, cause the foldable computing device to: identify a beginning of a user interface gesture in a first display region of the foldable computing device, wherein the user interface gesture is associated with a user interface item, and wherein the foldable computing device comprises a second display region; determine a gesture target zone on the first display region based on a beginning location of the user interface gesture and a location of the second display region; determine that the user interface gesture ended within the gesture target zone; and in response to determining that the user interface gesture ended within the gesture target zone, perform an operation associated with the user interface item and the second display region.

Example 17: The non-transitory computer-readable storage medium of Example 16, wherein the operation is performed only if the user interface gesture ends within a defined period of time after entering the gesture target zone and only if the user interface gesture ends after entering the gesture target zone without changing direction beyond a threshold angle.

Example 18: The non-transitory computer-readable storage medium of Example 16, further comprising: identifying potential gesture targets on the first display region; in response to the gesture coming within a defined distance of one or more of the potential gesture targets on the first display region, moving the gesture target zone closer to the second display region.

Example 19: The non-transitory computer-readable storage medium of Example 16, wherein the user interface gesture comprises a compound gesture that begins as a manipulation gesture that moves the user interface item and ends as a symbolic gesture that does not move the user interface item, and wherein the symbolic gesture determines or modifies which of a plurality of operations associated with the second display region are performed.

Example 20: The non-transitory computer-readable storage medium of Example 19, wherein the manipulation gesture moves the user interface item to the second display region before the symbolic gesture is performed.

Based on the foregoing, it should be appreciated that technologies for predictive gesture optimizations for moving objects across display boundaries have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method performed by a foldable computing device, comprising:
    identifying a beginning of a user interface gesture in a first display region of the foldable computing device, wherein the user interface gesture is associated with a user interface item, and wherein the foldable computing device comprises a second display region that is separated from the first display region via a fold;
    defining a gesture target zone within the first display region;
    dynamically adjusting a location, a size, an orientation, or a shape of the gesture target zone during the user interface gesture based on a location, a direction, or a speed of the user interface gesture, wherein the gesture target zone is moved closer to the beginning of the user interface gesture when the speed of the user interface gesture is determined to exceed a defined threshold;
    detecting an end of the user interface gesture in the first display region of the foldable computing device;
    if the user interface gesture ends within the gesture target zone, performing a display operation associated with the user interface item and the second display region; and
    if the user interface gesture ends outside of the gesture target zone, performing a different operation associated with the first display region or no operation at all.

2. The computer-implemented method of claim 1, further comprising:
    during the user interface gesture, when the user interface gesture is within the gesture target zone, displaying a visual effect in the second display region to preview the display operation that would be performed if the user interface gesture ended.

3. The computer-implemented method of claim 1, wherein the location, the size, or the shape of the gesture target zone is determined based in part on a location of the beginning of the user interface gesture and a location of the second display region.

4. A foldable computing device, comprising:
    one or more processors; and
    at least one non-transitory computer-readable storage medium having computer-executable instructions stored thereupon which, when executed by the one or more processors, cause the foldable computing device to:
        identify a beginning of a user interface gesture in a first display region of the foldable computing device, wherein the user interface gesture is associated with a user interface item, and wherein the foldable computing device comprises a second display region that is separated from the first display region via a fold;
        after the user interface gesture has started, determine a location of a threshold on the first display region based on a beginning location of the user interface gesture;
        determine that the user interface gesture crosses the location of the threshold;
        detect an end of the user interface gesture within the first display region; and
        in response to determining that the user interface gesture crosses the location of the threshold and ends within the first display region, perform a display operation associated with the user interface item and the second display region.

5. The foldable computing device of claim 4, wherein the display operation is performed in response to the user interface gesture being performed in less than a defined amount of time.

6. The foldable computing device of claim 4, wherein the foldable computing device has a posture based on an orientation of the first display region relative to an orientation of the second display region, and wherein the display operation associated with the second display region is selected in part based on the posture.

7. The foldable computing device of claim 4, wherein a size, a shape, or the location of the threshold is dynamically updated during the user interface gesture based on at least one of a direction or a speed of the user interface gesture.

8. The foldable computing device of claim 4, wherein the location of the threshold is made visible on the first display region when the user interface gesture traverses towards the location of the threshold at least a defined percentage of a distance between the beginning location of the user interface gesture and the location of the threshold.

9. The foldable computing device of claim 4, wherein the instructions further cause the foldable computing device to:
    determine whether the second display region comprises a user interface gesture target; and
    set the location of the threshold closer to the beginning location of the user interface gesture when the second display region comprises the user interface gesture target.

10. The foldable computing device of claim 4, wherein the instructions further cause the foldable computing device to:
    identify a plurality of gesture targets in the second display region;

define a location of a threshold in the first display region for each of the plurality of gesture targets; and select the display operation based on which of the plurality of locations of the thresholds the user interface gesture crosses.

11. The foldable computing device of claim 10, wherein the user interface gesture is pointed towards two or more of the plurality of gesture targets, wherein one of the two or more of the plurality of gesture targets is closer to the user interface gesture and the other of the two or more of the plurality of gesture targets is further from the user interface gesture, wherein the closer gesture target is selected when a velocity of the user interface gesture falls below a defined threshold, and wherein the further gesture target is selected when the velocity of the user interface gesture exceeds the defined threshold.

12. A computer-readable storage medium having computer-executable instructions stored thereupon which, when executed by a foldable computing device, cause the foldable computing device to:

identify a beginning of a user interface gesture in a first display region of the foldable computing device, wherein the user interface gesture is associated with a user interface item, and wherein the foldable computing device comprises a second display region that is separated from the first display region via a fold;

determine a gesture target zone on the first display region based on a beginning location of the user interface gesture;

determine that the user interface gesture ends within the gesture target zone; and in response to determining that the user interface gesture ends within the gesture target zone, perform a display operation associated with the user interface item and the second display region.

13. The computer-readable storage medium of claim 12, wherein the display operation is performed only if the user interface gesture ends within a defined period of time after entering the gesture target zone and only if the user interface gesture ends after entering the gesture target zone without changing direction beyond a threshold angle.

14. The computer-readable storage medium of claim 12, wherein the computer-executable instructions further cause the foldable computing device to:

identify potential gesture targets on the first display region;

in response to the user interface gesture coming within a defined distance of one or more of the potential gesture targets on the first display region, move the gesture target zone closer to the second display region.

15. The computer-readable storage medium of claim 12, wherein the user interface gesture comprises a compound gesture that begins as a manipulation gesture that moves the user interface item and ends as a symbolic gesture that does not move the user interface item, and wherein the symbolic gesture determines or modifies which of a plurality of operations associated with the second display region are performed.

16. The computer-readable storage medium of claim 15, wherein the manipulation gesture moves the user interface item to the second display region before the symbolic gesture is performed.

* * * * *